US012096173B2

(12) United States Patent
Cao et al.

(10) Patent No.: US 12,096,173 B2
(45) Date of Patent: Sep. 17, 2024

(54) BONE CONDUCTION EARPHONE AND METHOD FOR ASSEMBLING BONE CONDUCTION EARPHONE

(71) Applicant: Suzhou Thor Electronic Technology Co., Ltd., Jiangsu (CN)

(72) Inventors: Hongbin Cao, Jiangsu (CN); Jialong Shen, Jiangsu (CN); Juan Chen, Jiangsu (CN)

(73) Assignee: Suzhou Thor Electronic Technology Co., Ltd., Jiangsu (CN)

( * ) Notice: Subject to any disclaimer, the term of this patent is extended or adjusted under 35 U.S.C. 154(b) by 239 days.

(21) Appl. No.: 17/939,884

(22) Filed: Sep. 7, 2022

(65) Prior Publication Data

US 2023/0087039 A1 Mar. 23, 2023

(30) Foreign Application Priority Data

Sep. 18, 2021 (CN) .......................... 202111101484.5

(51) Int. Cl.
*H04R 25/00* (2006.01)
*H04R 1/10* (2006.01)

(52) U.S. Cl.
CPC .......... *H04R 1/1008* (2013.01); *H04R 1/105* (2013.01); *H04R 2460/13* (2013.01)

(58) Field of Classification Search
CPC ... H04R 1/1008; H04R 1/105; H04R 2460/13
USPC .......................................................... 381/151
See application file for complete search history.

(56) References Cited

U.S. PATENT DOCUMENTS

| | | | |
|---|---|---|---|
| 2010/0316235 A1 | 12/2010 | Park et al. | |
| 2013/0083940 A1 | 4/2013 | Hwang | |

FOREIGN PATENT DOCUMENTS

| | | |
|---|---|---|
| CN | 207978118 | 10/2018 |
| CN | 109511043 | 3/2019 |
| CN | 209267765 | 8/2019 |
| CN | 110278514 | 9/2019 |
| CN | 110708646 | 1/2020 |
| CN | 210469730 | 5/2020 |
| CN | 210868165 | 6/2020 |
| CN | 111988696 | 11/2020 |
| CN | 112367596 | 2/2021 |
| CN | 212572925 | 2/2021 |
| CN | 212785792 | 3/2021 |
| CN | 112887870 | 6/2021 |
| CN | 113271513 | 8/2021 |
| CN | 214381340 | 10/2021 |
| CN | 215379199 | 12/2021 |

(Continued)

*Primary Examiner* — Phylesha Dabney
(74) *Attorney, Agent, or Firm* — JCIPRNET

(57) ABSTRACT

The application discloses a bone conduction earphone and a method for assembling bone conduction earphone. The bone conduction earphone includes: a first bone conduction acoustic device; a second bone conduction acoustic device; the control compartment, which includes a main control board for controlling the first bone conduction acoustic device and the second bone conduction acoustic device; and the battery compartment, which includes a power supply for supplying power to the first bone conduction acoustic device, the second bone conduction acoustic device and the main control board. The bone conduction earphone of the present application has a more compact structure and a more convenient and efficient assembly.

21 Claims, 28 Drawing Sheets

(56) References Cited

FOREIGN PATENT DOCUMENTS

| | | |
|---|---|---|
| CN | 215835547 | 2/2022 |
| KR | 20110129507 | 12/2011 |
| WO | 2011149282 | 12/2011 |
| WO | 2021063113 | 4/2021 |

BONE CONDUCTION EARPHONE AND METHOD FOR ASSEMBLING BONE CONDUCTION EARPHONE

CROSS-REFERENCE TO RELATED APPLICATION

This application claims the priority benefit of China application serial No. 202111101484.5, filed on Sep. 18, 2021. The entirety of the above-mentioned patent application is hereby incorporated by reference herein and made a part of this specification.

BACKGROUND

Technical Field

The application relates to the technical field of loudspeakers, in particular to a bone conduction earphone and a method for assembling bone conduction earphone.

Description of Related Art

Bone conduction earphone is a kind of earphone made by using bone conduction sound transmission way, and comprises a bone conduction acoustic device for generating sound. Compared with the traditional way of transmitting sound through air sound waves, the bone conduction sound transmission way directly transmits vibration to the auditory nerve through the bones, eliminating many steps of air sound wave transmission. Therefore, both ears may be released without damaging the eardrum, and a clear sound reproduction can be achieved in a noisy environment. Moreover, the sound waves will not affect others due to the diffusion in the air, and therefore it is loved by the majority of consumers.

The existing bone conduction earphones often have complex structure and large volume. For example, the bone conduction acoustic device has many parts, and the assembly process of the bone conduction acoustic device and the bone conduction earphone is complicated. The miniaturization of bone conduction acoustic device will limit the installation of its internal components, making the installation of its internal components more inconvenient. In addition, the sound quality of the existing bone conduction earphones is not ideal, especially the low frequency performance is poor.

Therefore, it is necessary to improve the prior art to overcome the defects in the prior art.

SUMMARY

The purpose of the present application is to provide a bone conduction earphone and a method for assembling bone conduction earphone. The structure of the bone conduction earphone is more compact and the installation is more convenient.

In order to achieve the above-mentioned purpose of the application, in the first aspect, the present application provides a bone conduction earphone, comprising:

a first bone conduction acoustic device;

a second bone conduction acoustic device;

a control compartment, which includes a main control board for controlling the first bone conduction acoustic device and the second bone conduction acoustic device; and a battery compartment, which includes a power supply for supplying power to the first bone conduction acoustic device, the second bone conduction acoustic device and the main control board;

wherein the first bone conduction acoustic device and the second bone conduction acoustic device both comprise:

a case, which includes a base case portion and a side case portion connected with the base case portion, a cavity with an opening at one end is formed between the base case portion and the side case portion, the case is provided with a wiring hole connected with the cavity;

a cover, connected to the side case portion and sealing the opening;

a magnet assembly, connected to the cover, and located in the cavity;

a voice coil assembly, arranged in the cavity, and arranged opposite to the magnet assembly for driving the magnet assembly to vibrate; and a circuit board, arranged in the cavity, and electrically connected to the voice coil assembly, and electrically connected to the main control board and the power supply by wiring through the wiring hole, the circuit board is located between the base case portion and the voice coil assembly.

Further, the bone conduction earphone further includes:

a neckline, connected between the control compartment and the battery compartment;

a first ear hook, connected between the battery compartment and the first bone conduction acoustic device; and a second ear hook, connected between the control compartment and the second bone conduction acoustic device.

Further, the battery compartment further includes a battery box, a wiring board electrically connected to the power supply, and a battery box cover that seals the battery box, the power supply and the wiring board are both arranged in the battery box.

Further, the neckline includes a first cable electrically connected between the wiring board and the main control board;

the first ear hook includes a second cable, which is electrically connected between the circuit board of the first bone conduction acoustic device and the wiring board;

the second ear hook includes a third cable electrically connected between the circuit board of the second bone conduction acoustic device and the main control board.

Further, the main control board is provided with a tact switch, and the control compartment is provided with a button corresponding to the tact switch;

further, the control compartment includes a control box, a control box cover that seals the control box, and a lighting element arranged on the main control board, the main control board is arranged in the control box, and the light of the lighting element can be observed from the outside of the control compartment.

Further the voice coil assembly comprise a coil, a first magnetically conductive part and a first magnetic part, and the coil and the first magnetic part are both connected to a side of the first magnetically conductive part close to the magnet assembly;

the magnet assembly includes a flexure spring connected with the cover, a second magnetically conductive part connected with the flexure spring, and a second magnetic part connected to a side of the second magnetically conductive part close to the voice coil assembly;

the coil generates an electromagnetic field with a changing polarity after being energized, the electromagnetic field can generate a varying attractive force and a repulsive force on the second magnetic part, and the second magnetic part drives the flexure spring to vibrate back and forth under the attractive force and the repulsive force Further, the first magnetic part and the second magnetic part are arranged opposite to each other in the same pole, and there is a first attractive force between the first magnetic part and the second magnetically conductive part, and there is a second attractive force between the second magnetic part and the first magnetically conductive part; when the coil is not energized, the resultant force of the first attractive force and the second attractive force is equal to the repulsive force between the first magnetic part and the second magnetic part.

Further, the flexure spring includes a body, an outer ring body surrounding the outside of the body, and a plurality of connecting arms connected between the body and the outer ring body, the outer ring body is connected to the cover, and the body is connected with the second magnetically conductive part;

further, the connecting arm is suspended in the air and is not in contact with the second magnetically conductive part;

further, the magnet assembly further includes a low-frequency adjustment plate connected between the body and the second magnetically conductive part, and the low-frequency adjustment plate is not in contact with the connecting arm.

Further, the cover is provided with an avoidance hole for avoiding the movement of the main body and the connecting arm.

Further, the case further includes a support seat connected with the side case portion, the support seat is provided with a position limiting groove, and the outer ring body is at least partially fit to the position limiting groove.

Further, the case further includes a reinforcing rib connected between the support seat, the base case portion and the side case portion;

the number of the reinforcing ribs is one; or, the number of the reinforcement ribs is multiple, and the multiple reinforcement ribs are arranged at intervals.

Further, the case further includes a supporting boss located in the cavity, and the first magnetically conductive part is mounted on the supporting boss, and an installation space for accommodating the circuit board is formed between the first magnetically conductive part and the base case portion.

Further, the surface of the cover in contact with the user's body has a normal line A; the angle between the vibration axis B of the magnet assembly and the normal line A is any value between 0° and 35°.

Further, the angle is any value between 0° and 10°.

Further, the cover includes a flexible layer for contact with the user's skin, the thickness of the flexible layer is 0.2~1 mm.

Further, the thickness of the flexible layer is 0.3~0.6 mm.

Further, the thickness of the flexible layer is 0.4~0.5 mm.

Further, the Young's modulus of the case and the cover is any value between 8 GPa and 2 GPa.

Further, the Young's modulus of the case and the cover is any value between 8 GPa and 25 GPa.

Further, the circuit board of the first bone conduction acoustic device includes a first microphone for receiving the user's voice and a second microphone for receiving ambient sound; the case is provided with a first microphone hole corresponding to the first microphone and a second microphone hole corresponding to the second microphone.

Further, the distance between the center of the first microphone hole and the second microphone hole is not less than 15 mm.

Further, the angle between the positive direction of the axis of the first microphone hole and the second microphone hole is not less than 70°.

Further, the angle between the positive direction of the axis of the first microphone hole and the second microphone hole is not less than 90°.

Further, the positive directions of the axes of the first microphone hole and the second microphone hole are not blocked by the auricle.

Further, the bone conduction earphone further includes a first waterproof and breathable membrane and a second waterproof and breathable membrane, the first waterproof and breathable membrane seals the first microphone hole, and the second waterproof and breathable membrane seals the second microphone hole.

Further, the second bone conduction acoustic device includes a button assembly that includes a switch provided on the circuit board and a pressing panel connected to the outer surface of the case for pressing to trigger the switch.

Further, the pressing panel includes a base connected to the case and a pressing part connected to the base, one end of the pressing part is connected to the base and the other end is suspended, the pressing portion includes a bump corresponding to the switch position and protruding toward the switch, and the case is provided with an avoidance through hole corresponding to the switch position.

Further, the button assembly further includes a flexible pad that seals the avoidance through hole and a pressing part located between the flexible pad and the switch.

In the second aspect, the present application provides a method for assembling bone conduction earphone for assembling the bone conduction earphone as described above, the method for assembling bone conduction earphone includes the steps of assembling a bone conduction acoustic device and an ear hook, and the step of assembling the bone conduction acoustic device and the ear hook includes the following steps:

installing the circuit board in the case;

installing the ear hook on the case and electrically connect the ear hook with the circuit board;

installing the voice coil assembly in the case, and electrically connecting the coil of the voice coil assembly with the circuit board;

installing the magnet assembly on the cover, and installing the cover with the magnet assembly on the case.

Further, through the steps of assembling the bone conduction acoustic device and the ear hook, a first bone conduction acoustic device connected to the first ear hook and a second bone conduction acoustic device connected to the second ear hook are obtained, and the method for assembling the bone conduction earphone further includes the following steps:

connecting the battery box and the control box to both ends of the neckline;

connecting the first ear hook to the battery box, and connecting the second ear hook to the control box;

assembling the battery box and the control box into a battery compartment and a control compartment, respectively.

Compared with the prior art, the present application has the following beneficial effects: in the present application, the magnet assembly is arranged to be connected to the cover, and the voice coil assembly is arranged to be connected to the case, therefore, when assembling, the circuit board may be installed in the case first, then install the ear hook and voice coil assembly, and connect the lead wire of the coil to the circuit board; finally, install the cover connected with the magnet assembly to the case, which realizes the installation of the bone conduction acoustic device and its connection with the ear hook, and its overall structure is simpler and more compact, and the assembly is more convenient; furthermore, the bone conduction earphone of the present application is provided with a neckline, a first ear hook and a second ear hook, which is more convenient to wear and has a more compact structure.

DESCRIPTION OF THE EMBODIMENTS

In order to make the above objectives, features, and advantages of the present application more obvious and understandable, the specific implementation manners of the present application will be described in detail below with reference to the drawings. It can be understood that the specific embodiments described herein are only used to explain the application, but not to limit the application. In addition, it should be noted that, for ease of description, the drawings only show parts of the structures related to the present application, but not all of the structures. Based on the embodiments in this application, all other embodiments obtained by those of ordinary skill in the art without creative work shall fall within the protection scope of this application.

The terms "including" and "having" and any variations of them in this application are intended to cover non-exclusive inclusions. For example, a process, method, system, product, or device that includes a series of steps or units is not limited to the listed steps or units, but optionally includes unlisted steps or units, or optionally also includes other steps or units inherent in these processes, methods, products or devices.

Reference to "embodiments" herein means that a specific feature, structure, or characteristic described in conjunction with the embodiments may be included in at least one embodiment of the present application. The appearance of the phrase in various places in the specification does not necessarily refer to the same embodiment, nor is it an independent or alternative embodiment mutually exclusive with other embodiments. Those skilled in the art clearly and implicitly understand that the embodiments described herein can be combined with other embodiments.

Figure 1:
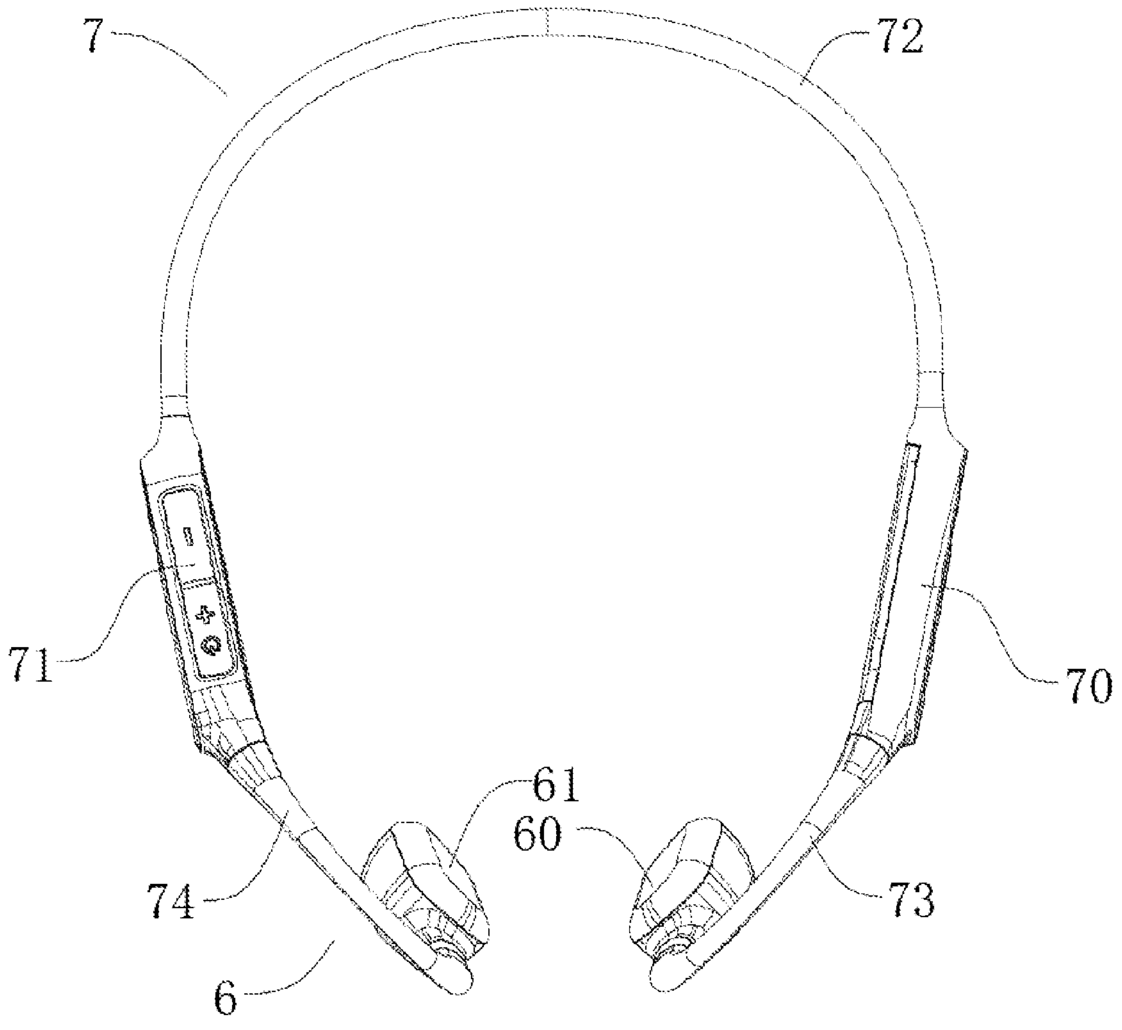
FIG. 1 is a schematic structural diagram of a bone conduction earphone according to an embodiment of the present application.
Figure 2:
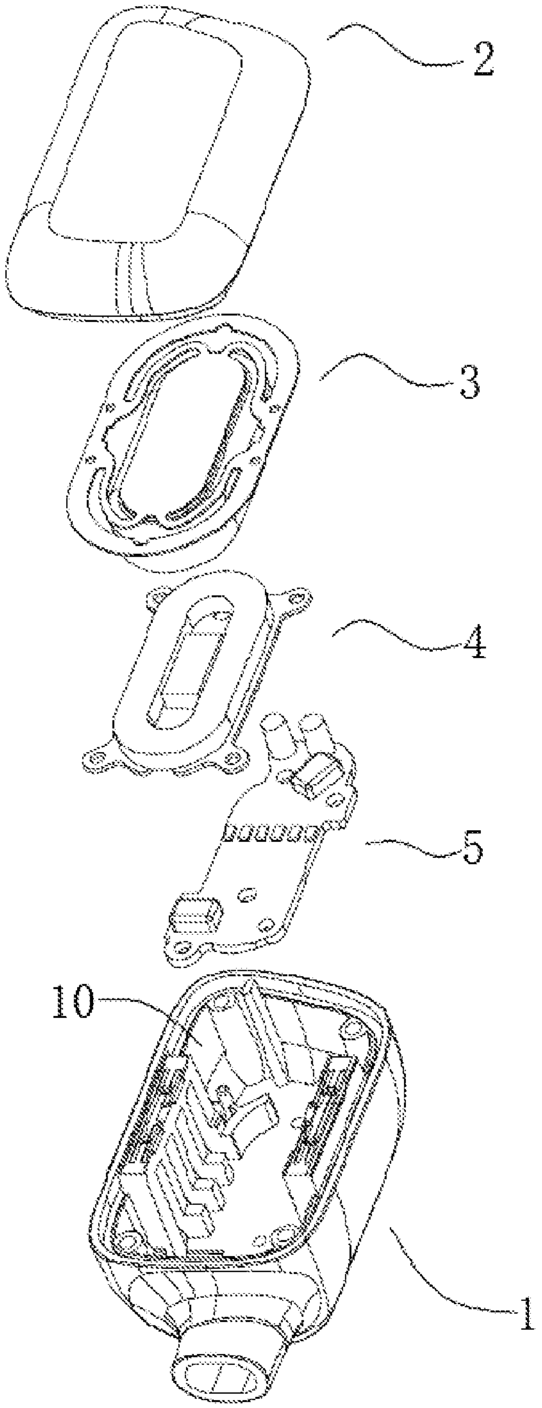
FIG. 2 is an exploded schematic diagram of a bone conduction acoustic device according to an embodiment of the present application.

As shown in FIG. 1, a bone conduction earphone corresponding to a preferred embodiment of the present application comprises an acoustic assembly 6 and a neck wear assembly 7 connected with the acoustic assembly 6, wherein the acoustic assembly 6 is used to generate sound by vibrating, and the neck wear assembly 7 is mainly used to fix the bone conduction earphone relative to the human head to prevent the bone conduction earphone from falling off. At the same time, the neck wear assembly 7 is also integrated with energy supply and control functions.

Specifically, the acoustic assembly 6 comprises at least one bone conduction acoustic device. In this embodiment, the number of bone conduction acoustic devices is two, i.e., the first bone conduction acoustic device 60 and the second bone conduction acoustic device 61. When worn, the first bone conduction acoustic device 60 and the second bone conduction acoustic device 61 are respectively attached to the vicinity of the left and right ears (usually pressing against the temporal bone). After vibration, the sound is conducted through the temporal bone to the auditory nerve to produce the sensation of hearing. It can be understood that the positions of the first bone conduction acoustic device 60 and the second bone conduction acoustic device 61 can also be interchanged, that is, it can also be designed such that, when worn, the first bone conduction acoustic device 60 is located near the right ear, and the second bone conduction acoustic device 61 is located near the left ear.

The specific structure of the bone conduction acoustic device is as follows, referring to FIGS. 2 to 21, which includes a case 1, a cover 2 connected to the case 1, and a magnet assembly 3, voice coil assembly 4 and circuit board 5 which are all arranged between the case 1 and the cover 2.

Figure 3:
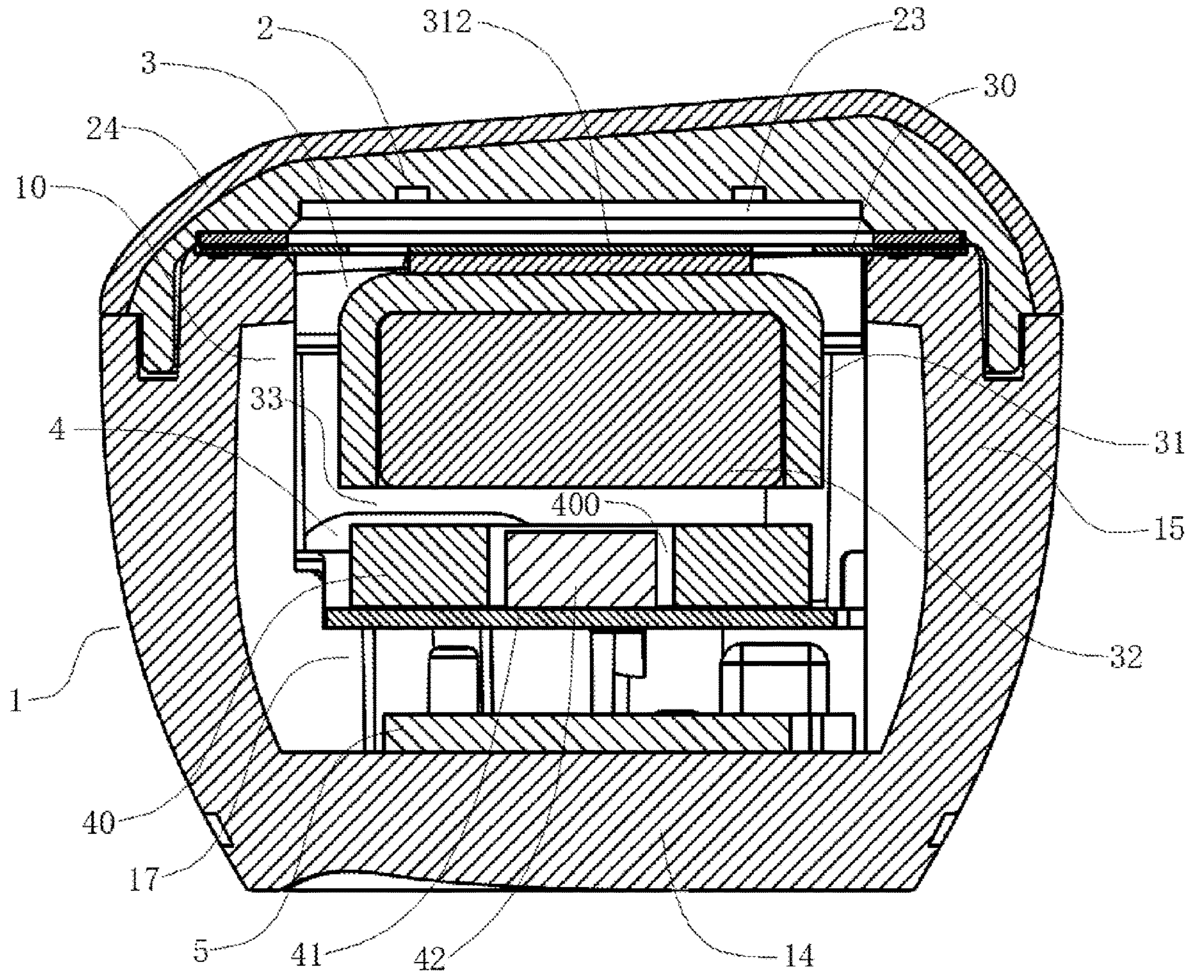
FIG. 3 is schematic cross-sectional view of a bone conduction acoustic device according to an embodiment of the present application.

Among them, as shown in FIG. 3, the case 1 comprises a base case portion 14 and a ring-shaped side case portion 15 protruding outward from the outer edge of the base case portion 14. A cavity 10 is formed between the base case portion 14 and the side case portion 15, which is used to accommodate the magnet assembly 3, the voice coil assembly 4, and the circuit board 5. The cavity 10 has an opening at one end away from the base case portion 14 to facilitate the installation of the magnet assembly 3, the voice coil assembly 4 and the circuit board 5.

The cover 2 is connected with the side case portion 15 of the case 1 and is located at the opening end of the cavity 10. After the cover 2 is connected with the case 1, it seals the opening.

The connection manner between the cover 2 and the case 1 is not limited. In the embodiment, the cover 2 and the side case portion 15 are fixed by gluing. Specifically, referring to FIGS. 4 and 5, the cover 2 is provided with a convex annular boss 22. The end of the side case 15 is provided with a recessed annular groove 150. The annular boss 22 is mated with the annular groove 150 and can be inserted into the annular groove 150. The annular groove 150 is provided with glue, so that the cover 2 can be reliably connected with the side case portion 15. Preferably, there is a gap between the annular groove 150 and the annular boss 22, so that there is a sufficient amount of glue between them, and the connection is stronger. The case 1 is also provided with a first positioning hole 151, and the cover 2 is provided with a first positioning post 26 corresponding to the first positioning hole 151. The first positioning post 26 is mated with the first positioning hole 151. During installation, the first positioning hole 151 and the first positioning post 26 can cooperate to guide the cover 2 to be installed on the case 1. The first positioning hole 151 and the first positioning post 26 can also improve the assembly accuracy of the case 1 and the cover 2, and improve the connection strength after installation. The number of the first positioning posts 26 is not limited. In the embodiment, the number is four, and correspondingly, the number of the first positioning holes 151 is also four.

The magnet assembly 3 and the voice coil assembly 4 are arranged opposite to each other in the cavity 10, wherein the magnet assembly 3 is connected to the cover 2, and the voice coil assembly 4 is connected to the case 1 and is closer to the base case portion 14 than the magnet assembly 3. The connection manner between the magnet assembly 3 and the cover 2 and the connection manner between the voice coil assembly 4 and the case 1 may both be, for example, adhesive connection manner. As shown in FIG. 3, the voice coil assembly 4 is used to drive the magnet assembly 3 to vibrate. The voice coil assembly 4 is electrically connected to the circuit board 5 and powered by the circuit board 5. The circuit board 5 can control the magnet assembly 3 to generate vibrations of different amplitudes and frequencies by controlling the magnitude, direction and other parameters of the current input into the voice coil assembly 4. The cover 1, when contacting the human face, may enable people to receive different sounds through solid sound transmission.

Obviously, in order not to affect the vibration of the magnet assembly 3, there is a separate space 33 between the magnet assembly 3 and the voice coil assembly 4.

The circuit board 5 is preferably arranged at the bottom of the cavity 10 (the bottom of the cavity 10 refers to the end close to the base case portion 14) and is located between the base case portion 14 and the voice coil assembly 4. This arrangement can make full use of the internal space of the case 1, and the circuit board 5 and the voice coil assembly 4 can be installed in sequence, so that the installation is more convenient. In this embodiment, the case 1 is also provided with a wiring hole 11 connected with the cavity 10, and wires can be routed through the wiring hole 11 to electrically connect the circuit board 5 to an external circuit. For example, it can be electrically connected to the power supply, control board, etc. inside the neck wear assembly 7, so as to supply power to the voice coil assembly 4, and to change the parameters such as current and voltage input to the voice coil assembly 4 according to the control signal. It is not required to arrange the components such as the control board and the power supply in the cavity 10, so the volume of the bone conduction acoustic device can be greatly reduced, to facilitate the installation of internal components.

It can be understood that, in the bone conduction acoustic device of the present application, the magnet assembly 3 is connected to the cover 2 as a whole, and the voice coil assembly 4 is connected to the case 1 as a whole. Therefore, during installation, the circuit board 5 and the voice coil assembly 4 can be installed in the case 1 first, and then the cover 2 with the magnet assembly 3 may be installed on the case 1 to complete the installation of the bone conduction acoustic device. Installation is very convenient. In addition, both the magnet assembly 3 and the voice coil assembly 4 can be assembled outside the case 1, and connected to the cover 2 or the case 1 after the assembly, and both of them are assembled in an open environment, therefore their installation is also very convenient.

Figure 6:
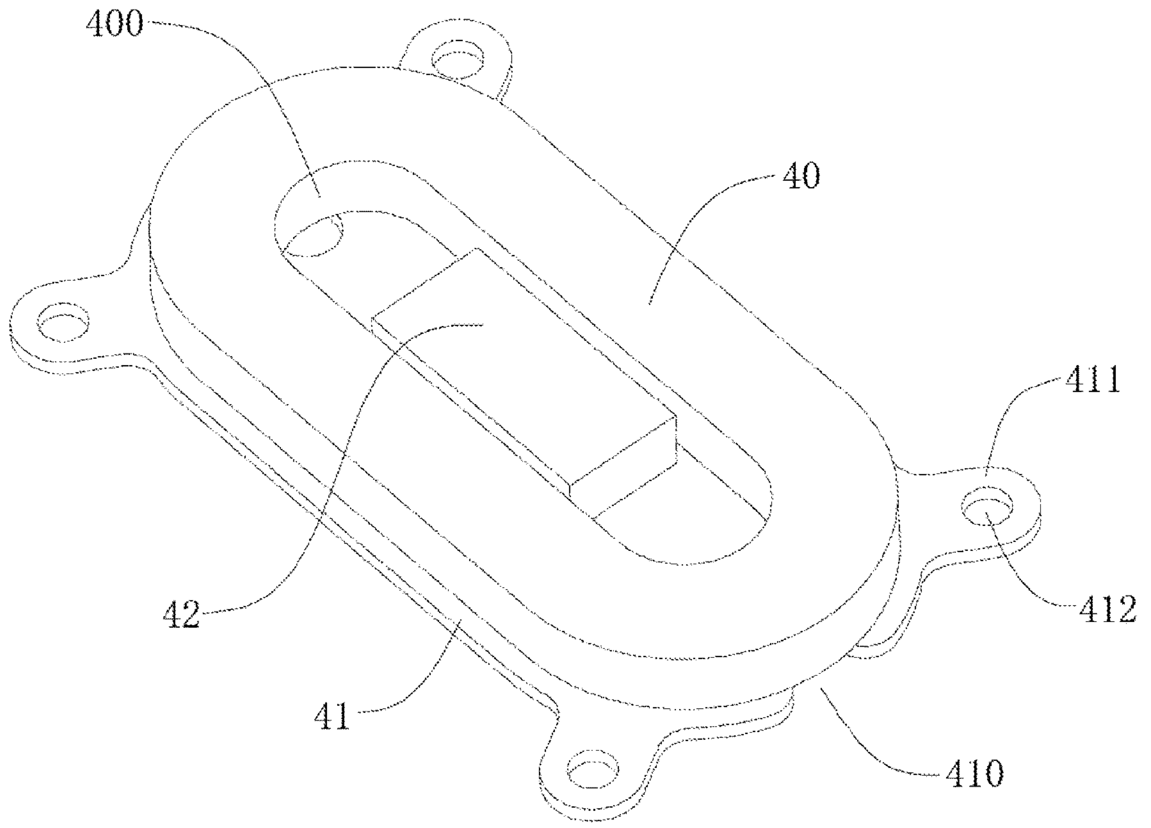
FIG. 6 is a schematic structural diagram of a voice coil assembly according to an embodiment of the present application.
Figure 7:
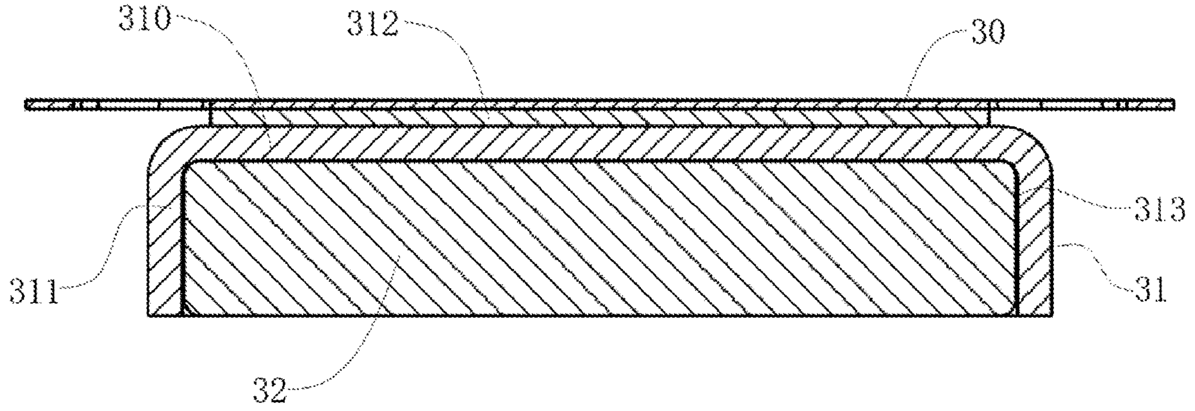
FIG. 7 is a schematic cross-sectional view of a magnet assembly according to an embodiment of the present application.

As a preferred embodiment, in this embodiment, as shown in FIGS. 3 and 6, the voice coil assembly 4 includes a coil 40, a first magnetically conductive part 41 and a first magnetic part 42. Both the first magnetic part 42 and the coil 40 are connected to the first magnetically conductive part 41, and are connected to the side of the first magnetically conductive part 41 close to the magnet assembly 3. The connection between the first magnetic part 42, and the coil 40 as well as the first magnetically conductive part 41 is not limited. For example, it may be adhesive connection. As shown in FIG. 7, the magnet assembly 3 includes a flexure spring 30 connected to the cover 2, a second magnetically conductive part 31 connected to the flexure spring 30, and the second magnetic part 32 connected to one side of the second magnetically conductive part 31 close to the voice coil assembly 4. The flexure spring 30 and the second magnetically conductive part 31 together with the second magnetic part 32 and the second magnetically conductive part 31 can also be connected by glue. Since the flexure spring 30 has elasticity, it can be elastically deformed under force, so that the magnet assembly 3 can vibrate.

The coil 40 has lead wires, and is connected to the circuit board 5 by the lead wires to realize the electrical connection between the circuit board 5 and the coil 40. After the coil 40 is energized, an electromagnetic field is generated. The direction and strength of the electromagnetic field can be changed by controlling the magnitude, direction and other related parameters of the current in the coil 40, thereby generating an electromagnetic field with periodic or non-periodic changes in polarity. The electromagnetic field applies periodic or non-periodic attractive or repulsive force on the second magnetic part 32, thereby driving the second magnetic part 32 to drive the flexure spring 30 to vibrate back and forth periodically or non-periodically. By controlling the vibration amplitude, frequency and other parameters of the magnet assembly 3 though coil 30, the person wearing the bone conduction sound generating device can hear the corresponding sound.

The first magnetic part 42 and the second magnetic part 32 are magnets, which can attract ferromagnetic substances. The first magnetically conductive part 41 and the second magnetically conductive part 31 are not magnetic, but can be attracted by a magnet. The first magnetically conductive part 41 and the second magnetically conductive part 31 may be ferromagnetic metals such as iron, nickel, and cobalt. The first magnetic part 42 and the second magnetic part 32 are arranged opposite to each other in the same pole, that is, the polarities of the two magnetic poles of the first magnetic part 42 and the second magnetic part 32 that are close to each other are the same, which makes the first magnetic part 42 and the second magnetic part 32 have mutually repulsive forces. Since the first magnetically conductive part 41 and the second magnetically conductive part 31 can be attracted by magnets, a first attractive force will be generated between the first magnetic part 42 and the second magnetically conductive part 31, and a second attractive force will be generated between the second magnetic part 32 and the first magnetically conductive part 41. Preferably, the resultant force of the first attractive force and the second attractive force is equal to the repulsive force, which makes the flexure spring 30 in a balanced state of force, without internal stress and vibrate better in response to the change of magnetic force caused by the change of the magnetic field, to achieve a better fidelity effect. The magnetic energy levels of the first magnetic part 42 and the second magnetic part 32 can be the same, for example, the magnetic energy levels of both are N48; or they may be different, for example, the magnetic energy level of the first magnetic part 42 is N48, and the magnetic energy of the second magnetic part 32 is N35, and vice versa. In specific applications, the magnetic energy levels of the first magnetic part 42 and the second magnetic part 32 may be dynamically adjusted according to the required attractive force and repulsive force.

The coil 40 is ring-shaped and has a central hole 400. As a preferred embodiment, the first magnetic part 42 is disposed in the central hole 400 of the coil 40. As a preferred embodiment, the shape of the outer peripheral surface of the first magnetic part 42 is consistent with the shape of the central hole 400. It can be understood that under the condition that the size of the central hole 400 is constant, the size of the gap between the outer peripheral surface of the first magnetic part 42 and the inner wall of the central hole 400 determines the volume of the first magnetic part 42 and thus determines the magnitude of the magnetic force between the first magnetic part 42 and the second magnetic part 32. Generally, the smaller the gap, the larger the volume of the first magnetic part 42 and the greater the magnetic force, and vice versa. The smaller the gap, the greater the difficulty of assembly. As a preferred embodiment, the gap between the outer peripheral surface of the first magnetic part 42 and the inner wall of the central hole 400 is above 0.05 mm, so that the first magnetic part 42 is easier to install. Further, the height of the first magnetic part 42 is set not higher than the height of the coil 40, so that the coil 40 and the second magnetic part 32 is closer, which enables the magnet assembly 3 to vibrate more sensitively in response to changes in the magnetic field of the coil 40.

The shape of the first magnetically conductive part 41 and the second magnetically conductive part 31 is not limited. In a preferred embodiment, the first magnetically conductive part 41 and the second magnetically conductive part 31 are both plate-shaped. FIG. 6 shows the state when the first magnetic conductive part 41 is plate-shaped. In another preferred embodiment, both the first magnetically conductive part 41 and the second magnetically conductive part 31 include a plate portion 310 having a plate shape, and a ring portion 311 protruding from the plate portion 310. A receiving cavity 313 is formed between the ring portion 311 and the plate portion 310. The second magnetic part 32 of the magnet assembly 3 is accommodated in the receiving cavity 313 of the second magnetically conductive part 31. The coil 40 of the voice coil assembly 4 and the first magnetic part 42 is accommodated in the receiving cavity 313 of the first magnetically conductive part 41. Referring to FIG. 7, FIG. 7 shows a state when the second magnetic conductive part 31 includes the plate portion 310 and the ring portion 311. In other embodiments, one of the first magnetically conductive part 41 and the second magnetically conductive part 31 has a plate shape, and the other includes a plate portion 310 and a ring portion 311 protruding from the plate portion 310. In this embodiment, the first magnetically conductive part 41 is plate-shaped, and the second magnetic conductive part 31 includes a plate portion 310 and a ring portion 311 protruding from the plate portion 310.

Figure 8:
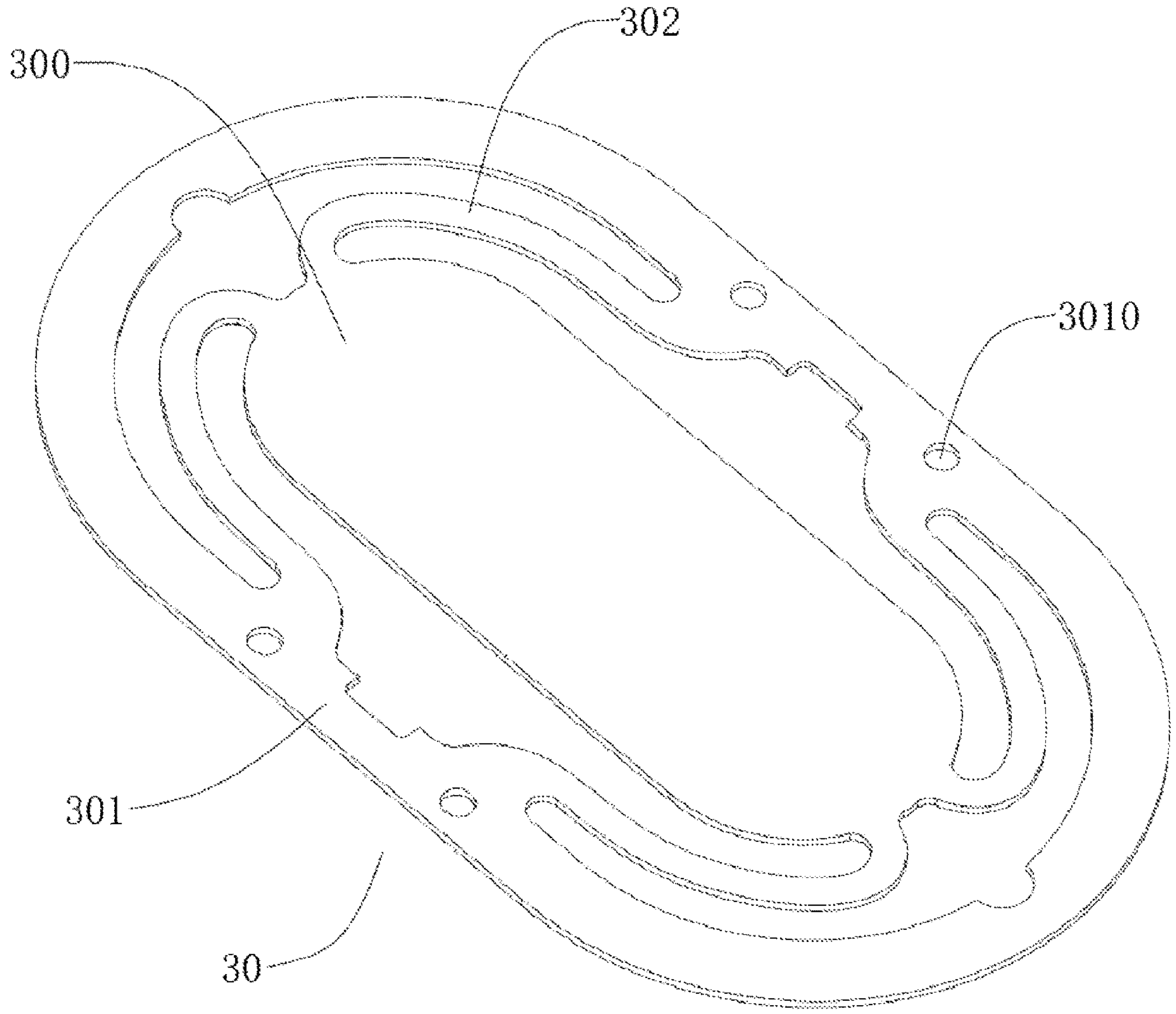
FIG. 8 is a schematic structural diagram of a flexure spring according to an embodiment of the present application.

As a preferred embodiment, as shown in FIG. 8, the flexure spring 30 is in the shape of a sheet as a whole, and includes a body 300, an outer ring body 301 arranged around the outside of the body 300, and a number of connecting arms 302 connected between the body 300 and the outer ring body 301 (in this embodiment, the number of connecting arms 302 is 4), wherein the outer ring body 301 is used to connect with the cover 2 and the case 1, and the main body 300 is connected with the second magnetically conductive part 31. When the magnet assembly 3 vibrates, the outer ring body 301 is fixed, and the displacement of the main body 300 and the second magnetically conductive part 31 and the second magnetic part 32 during vibration is realized by the elastic deformation of the connecting arm 302.

Figure 5:
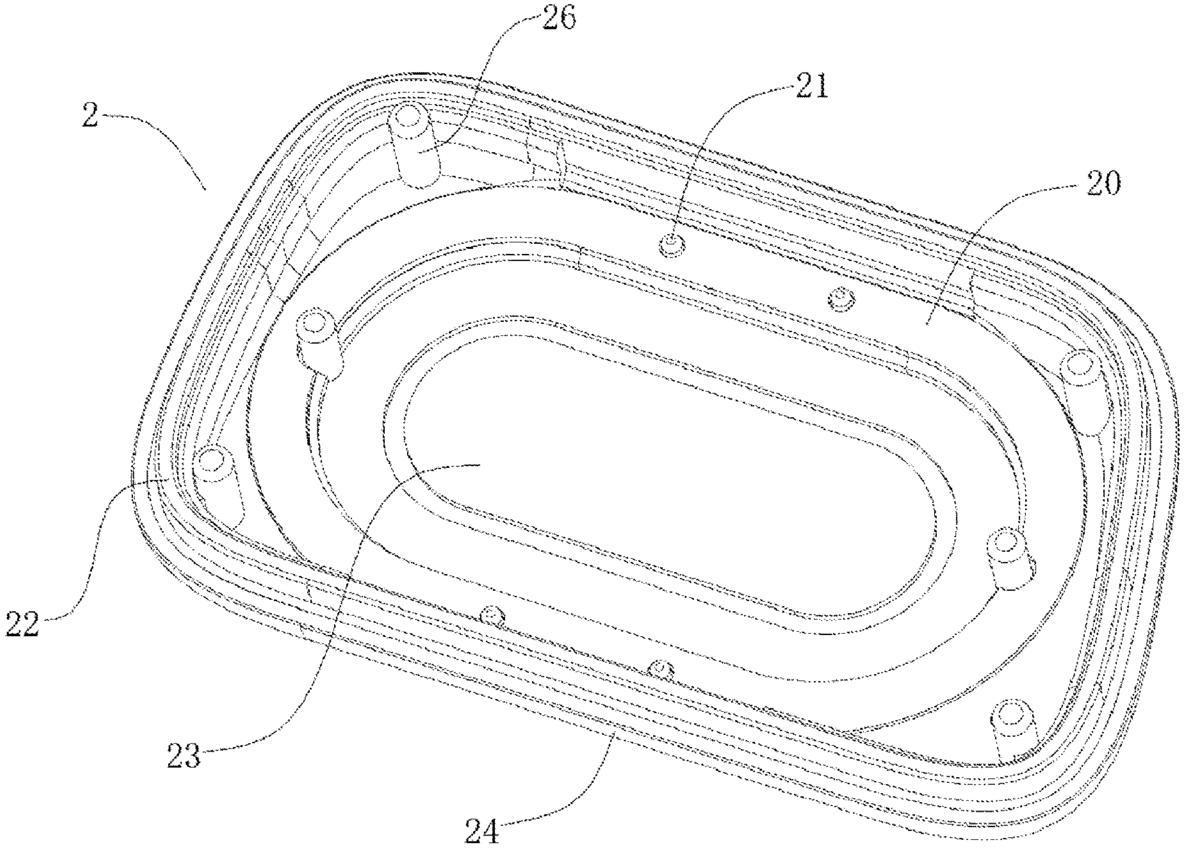
FIG. 5 is a schematic structural diagram of a cover according to an embodiment of the present application.
Figure 9:
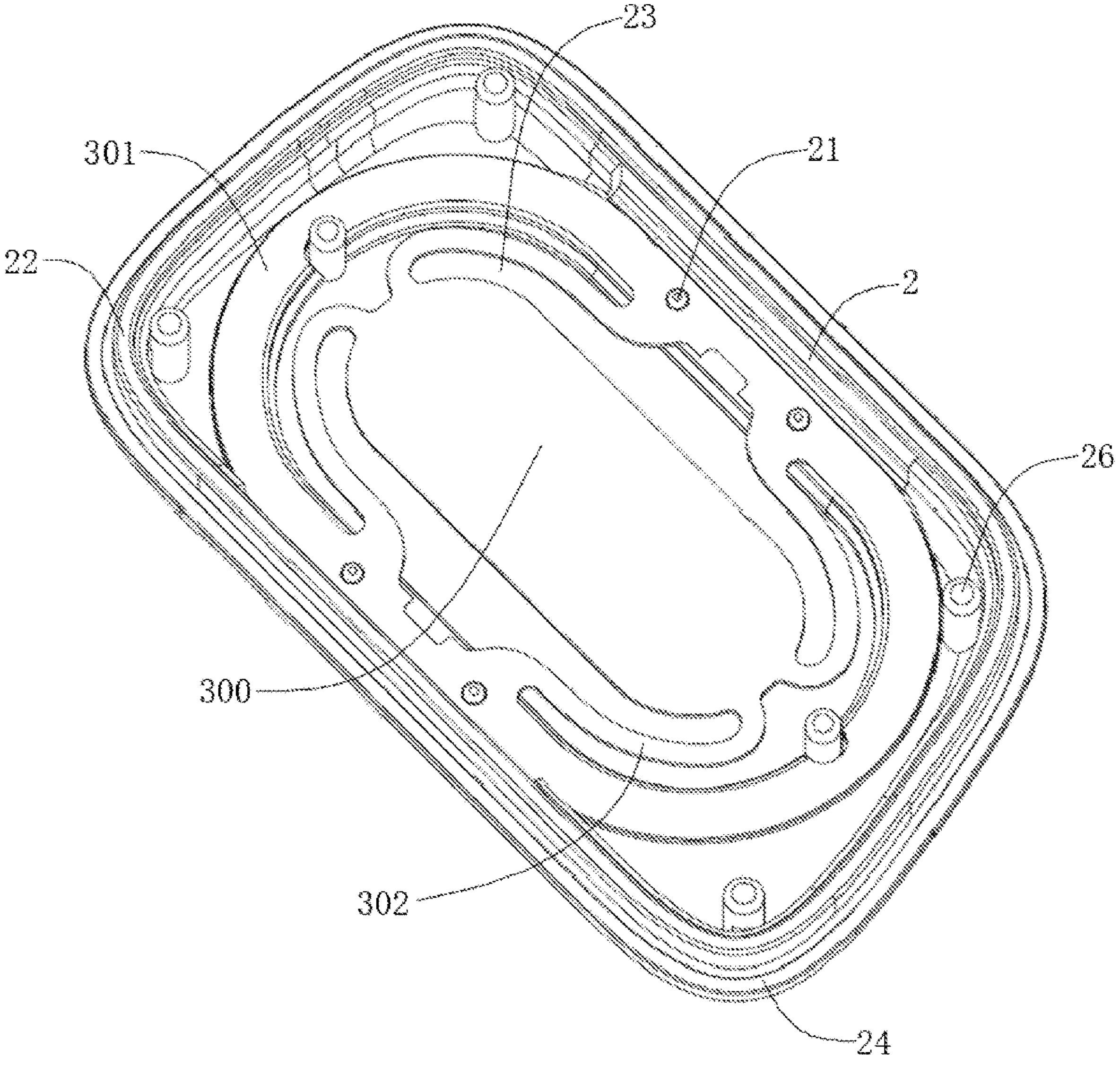
FIG. 9 is a schematic diagram of the connection between the flexure spring and the cover according to an embodiment of the present application.

As shown in FIGS. 5, 8 and 9, the cover 2 has a connecting surface 20 for adhering to the outer ring body 301, and the first surface of the outer ring body 301 and the connecting surface 20 are preferably connected by glue. A convex positioning shaft 21 is provided on the connecting surface 20, and the outer ring body 301 is provided with a first positioning through hole 3010 adapted to the positioning shaft 21. The positioning of the flexure spring 30 is realized by the mating of the positioning shaft 21 and the first positioning through hole 3010, so that the position accuracy of the flexure spring 30 is better, and it will not shift or deviate during the movement. The number of positioning shafts 21 is not limited. In this embodiment, the number of positioning shafts 21 is four, and correspondingly, the number of positioning through holes 3010 is also four.

It is understandable that, in order to enable the flexure spring 30 to deform toward the side where the cover 2 is located, an avoidance hole 23 is provided on the surface of the cover 2 opposite to the flexure spring 30, so as to provide the space required by the body 300 and the connecting arm 302 during vibration.

In order to make the fixation of the flexure spring 30 more reliable, in addition to the first surface of the outer ring body 301 of the flexure spring 30 being connected to the cover 2, the second surface of the outer ring body 301 opposite to the first surface is supported by the case 1 and connected to the case 1. In this way, the two sides of the flexure spring 30 are respectively fixed by the cover 2 and the case 1, and the fixing of its position is more reliable.

Figure 4:
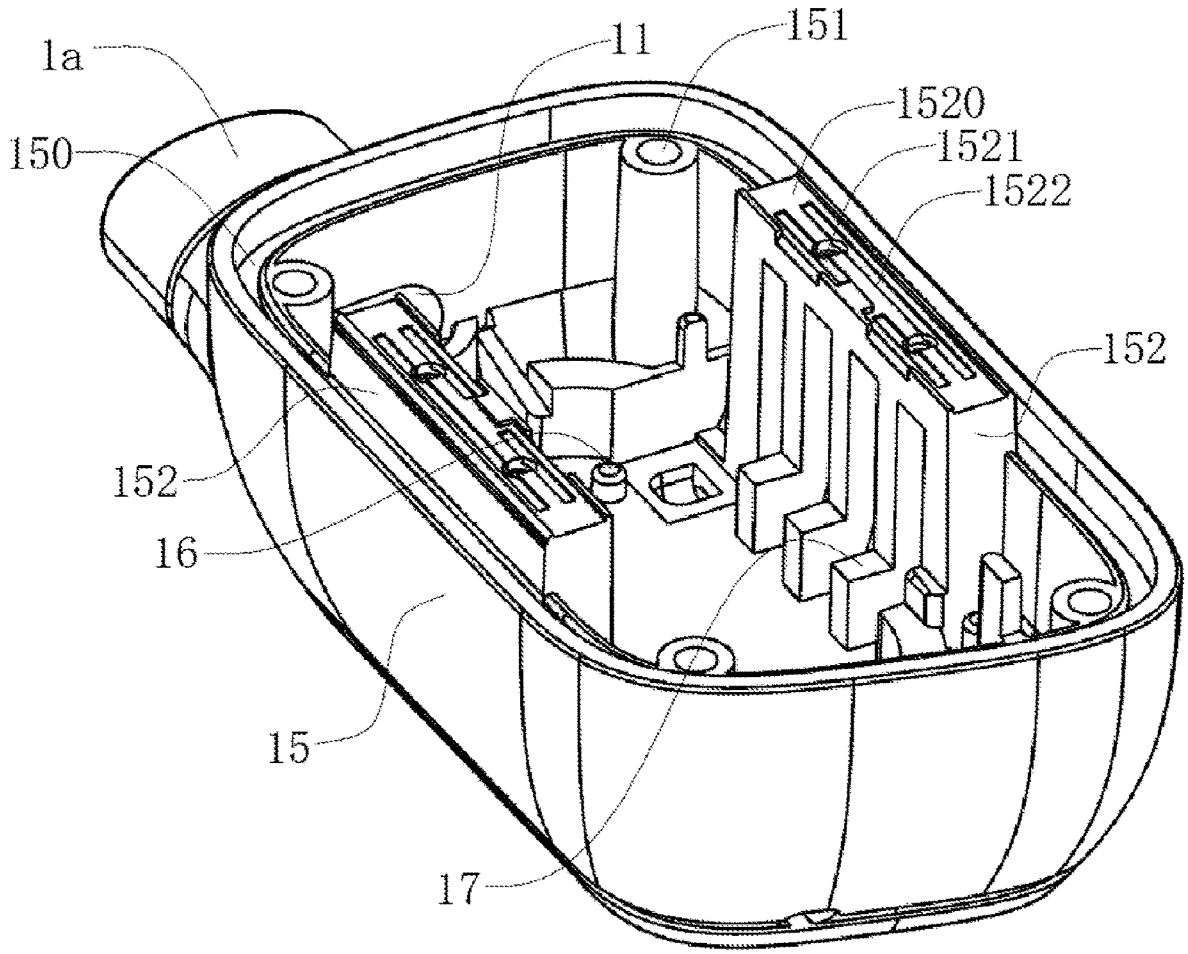
FIG. 4 is a schematic structural diagram of a case according to an embodiment of the present application.
Figure 10:
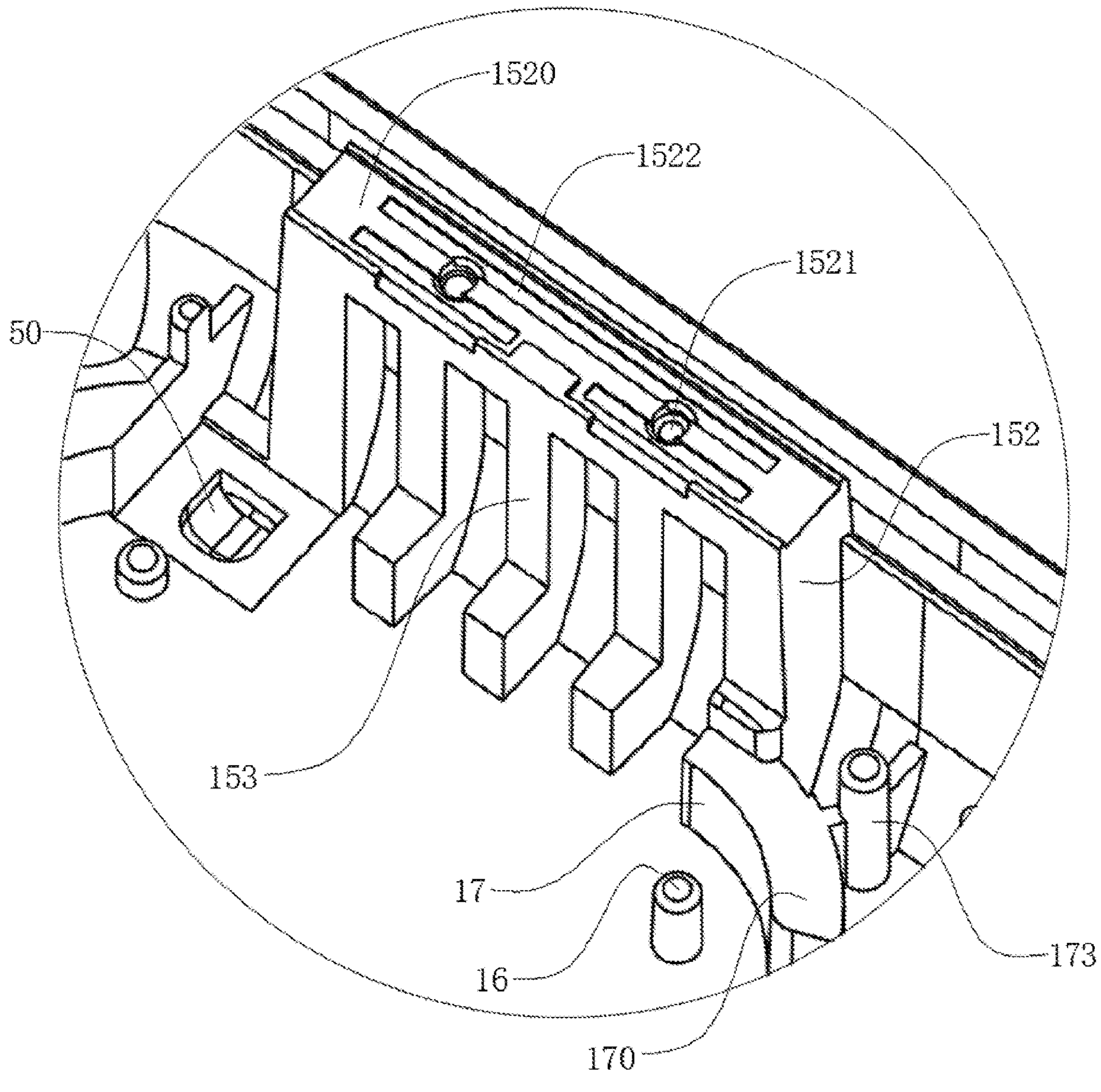
FIG. 10 is a schematic structural diagram of the support seat on the case according to an embodiment of the present application.

Specifically, referring to FIGS. 4 and 10, the case 1 is provided with a support seat 152 for supporting the flexure spring 30. The support seat 152 is located in the cavity 10 and connected to the side case portion 15. The support seat 152 is supported at least on the part where the outer ring body 301 and the connecting arm 302 are connected, and the number is not limited. In this embodiment, the number of the support seat 152 is two, which symmetrically support both sides of the flexure spring 30. In other embodiments the number of support seats 152 may be more, so as to support more parts of the flexure spring 30. The support seat 152 is provided with a position limiting groove 1520. The outer ring body 31 is fitted into the position limiting groove 1520, and a second positioning through hole 1521 corresponding to the position of the above-mentioned first positioning through hole 3010 is provided on the bottom surface of the position limiting groove 1520. After the installation is completed, the positioning shaft 21 of the cover 2 passes through the first positioning through hole 3010 and is simultaneously fitted into the second positioning through hole 1521, thereby further improving the firmness of the flexure spring 30 installation.

In order to enhance the firmness of the connection, the flexure spring 30 is adhered to the cover 2 by double-sided adhesive, and pasted on the support seat 152 by glue. Furthermore, a recessed glue overflow groove 1522 is provided on the bottom surface of the position limiting groove 1520. The glue overflow groove 1522 is connected with the second positioning through hole 1521 to accommodate more glue and enhance the firmness of the adhesion.

As a preferred embodiment, the upper end of the support base 152 extends beyond the upper end of the side case portion 15, so that when the cover 2 is installed, the alignment installation of the flexure spring 30 and the support seat 152 is more convenient, and the space for installing the magnet assembly 3 can also be increased.

As shown in FIG. 10, the case 1 further includes a reinforcing rib 153 connected to the support seat 152. The reinforcing rib 153 is supported on the bottom of the support seat 152 and connected to the side case portion 15 and the base case portion 14 to strengthen the stiffness of the support seat 152 and provide reliable support for the flexure spring 30. The number of the reinforcing ribs 153 may be one or more. In the case that the number of the reinforcing ribs 153 is multiple, the reinforcing ribs 153 are arranged at intervals, and there is a space between two adjacent reinforcing ribs 153. The structure of a plurality of reinforcing ribs 153 arranged at intervals can prevent the appearance of the case 1 from shrinking due to the partial thickness of the plastic, which is convenient for controlling the molding quality.

In order to allow the connecting arm 302 to be fully elastically deformed, and thereby the body 300 to have a greater amplitude, the connecting arm 302 is suspended so as not to contact the second magnetically conductive part 31. Therefore, it is avoided that the second magnetically conductive part 31 hinders the deformation of the connecting arm 302. In a preferred embodiment, as shown in FIG. 7, a low-frequency adjusting plate 312 is provided between the second magnetically conductive part 31 and the body 300, and the low-frequency adjusting plate 312 is in contact with the body 300 but not with the connecting arm 302. Therefore, the second magnetically conductive part 31 and the connecting arm 302 are separated to prevent the two from contacting. The low frequency adjusting plate 312 may be an independent component, or it may be integrally formed with the second magnetically conductive part 31 or the main body 300, where the low-frequency adjusting plate 312 is the protruding part of the second magnetically conductive part 31 or the body 300. The arrangement of the low-frequency adjusting plate 312 can make the vibration amplitude of the magnet assembly 3 larger, thereby making the low-frequency sound effect and sound quality of the bone conduction acoustic device better.

In the same way, the cover 2 is also set so as not to contact the connecting arm 302. At this time, the connecting surface 20 is set not to exceed the inner peripheral surface of the outer ring body 301. Preferably, the contour of the connecting surface 20 is the same as that of the outer ring body 301.

Figure 11:
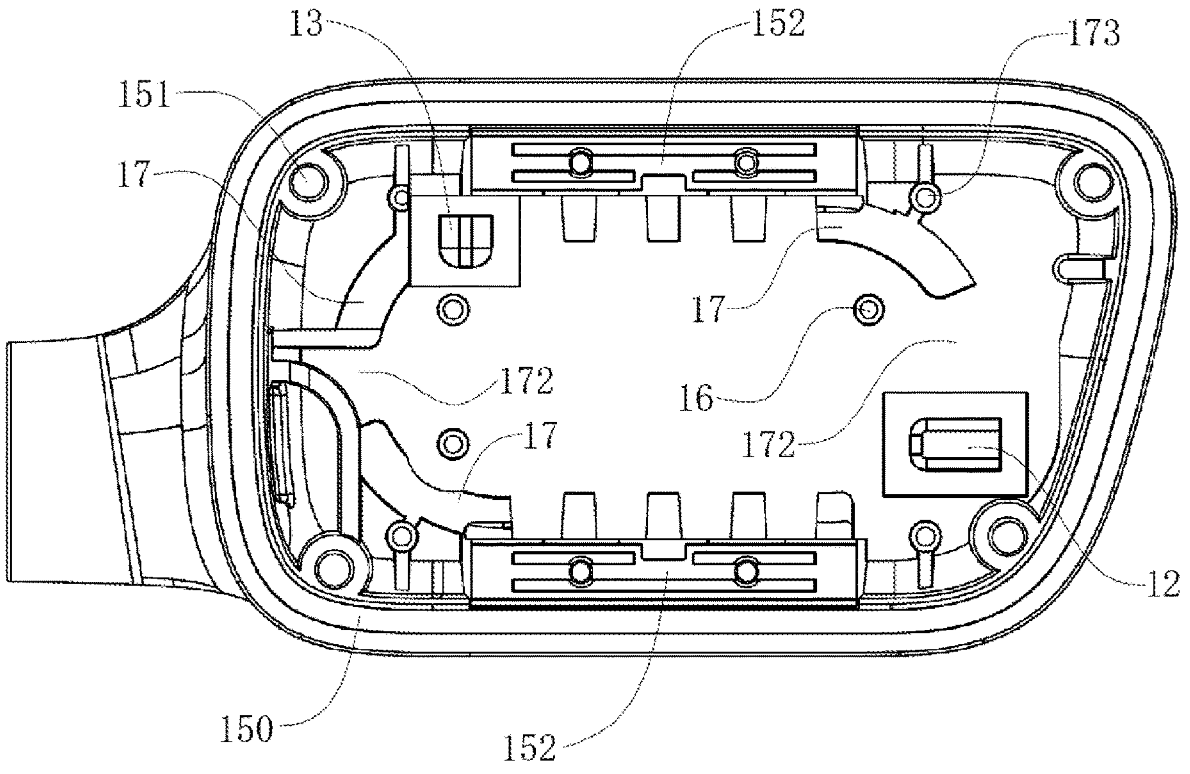
FIG. 11 is a plan view of a case according to an embodiment of the present application.
Figure 12:
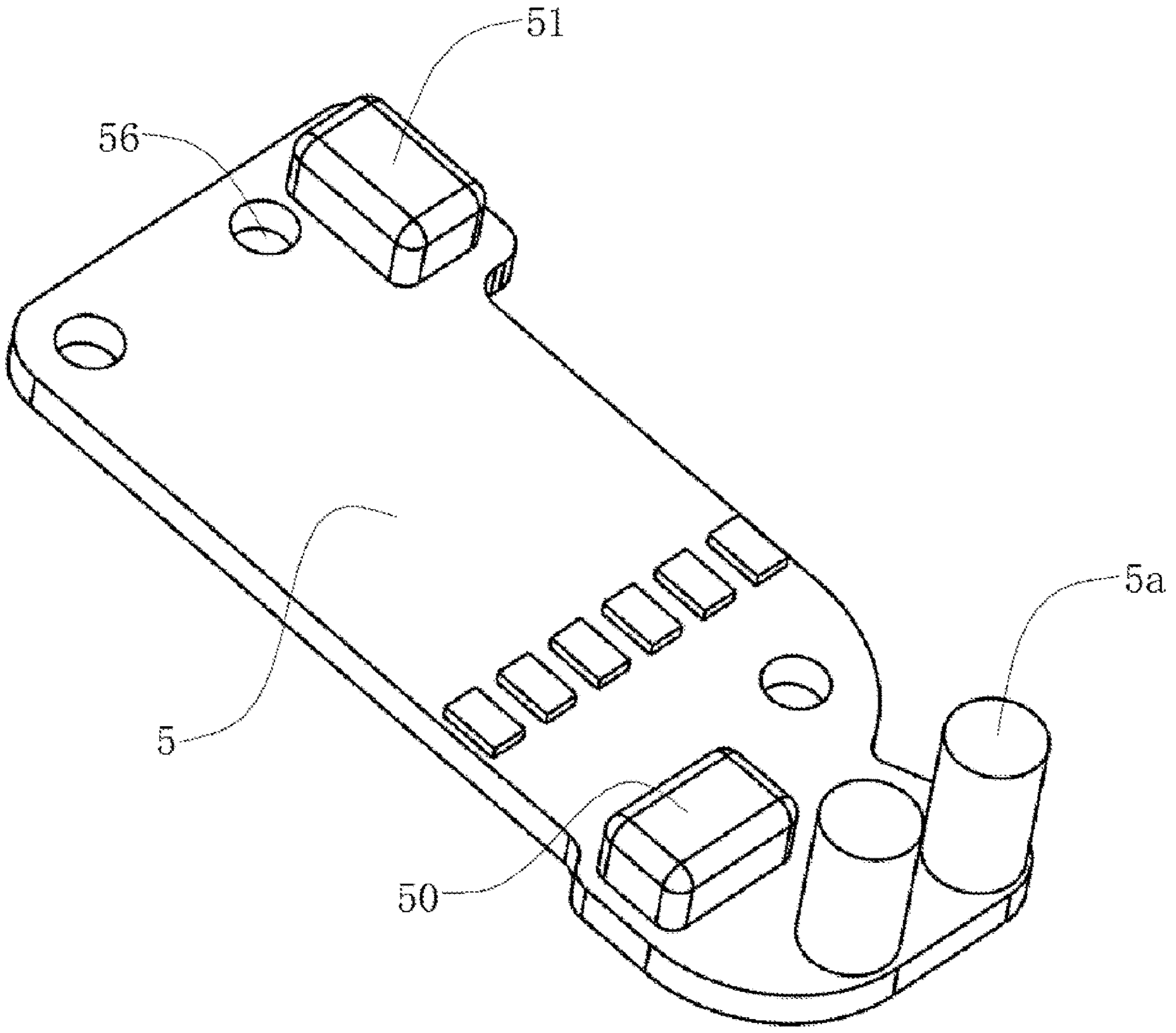
FIG. 12 is a schematic structural diagram of a circuit board according to an embodiment of the present application.
Figure 13:
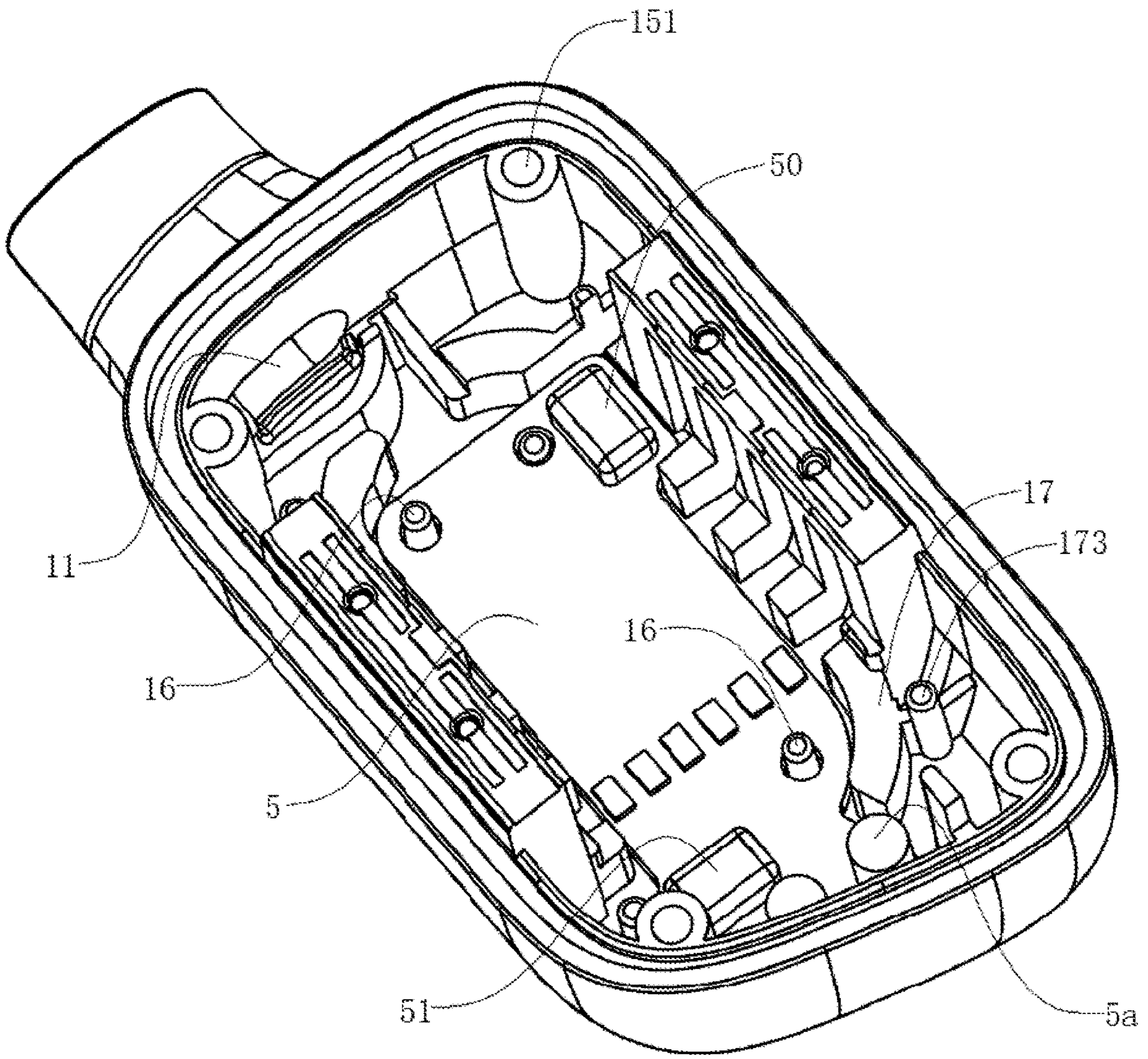
FIG. 13 is a schematic structural diagram of a circuit board installed in a case according to an embodiment of the present application.

In order to facilitate the installation of the circuit board 5, as shown in FIGS. 11 to 13, at least one third positioning post 16 protruding into the cavity 10 is provided on the base case portion 14. The circuit board 5 is provided with a circuit board positioning hole 56 adapted to the third positioning post 16 to position the circuit board 5 through the mating of the third positioning post 16 and the circuit board positioning hole 56. The connection manner of the circuit board 5 and the base case portion 14 is not limited. For example, when installing the circuit board 5, the glue may be applied on the surface of the circuit board 5 or the double-sided adhesive may be attached to the circuit board 5, and then the circuit board 5 is installed on the base case portion 14 through the third positioning post 16 to ensure the accuracy of the position of the circuit board 5. For another example, one or more of the third positioning posts 16 may be set as hot-melt posts, and the hot-melt posts are heated to melt and deform so that the circuit board 5 is fixed on the base case portion 14. For another example, the circuit board 5 can be fixed to the base case portion 14 by fasteners such as screws.

Figure 14:
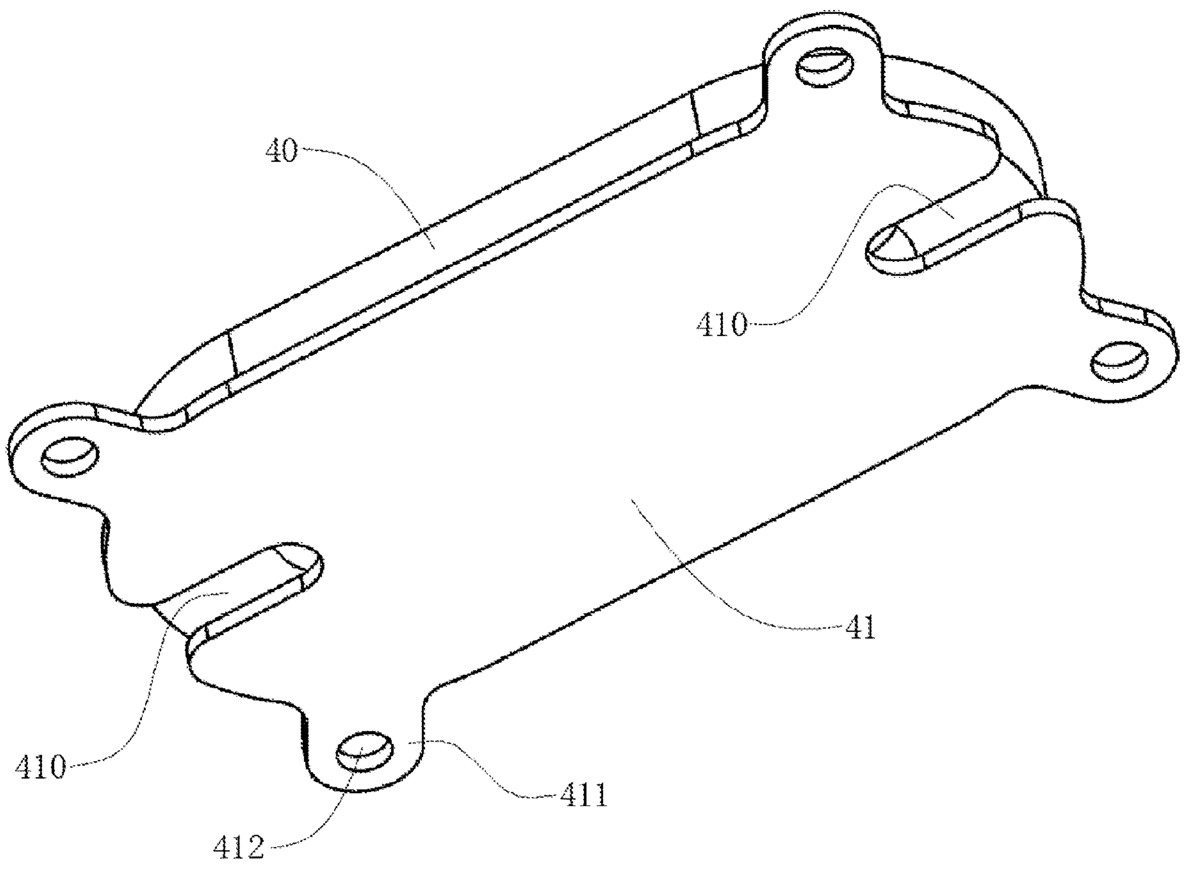
FIG. 14 is a schematic structural diagram of the voice coil assembly in FIG. 6 in another view direction.
Figure 15:
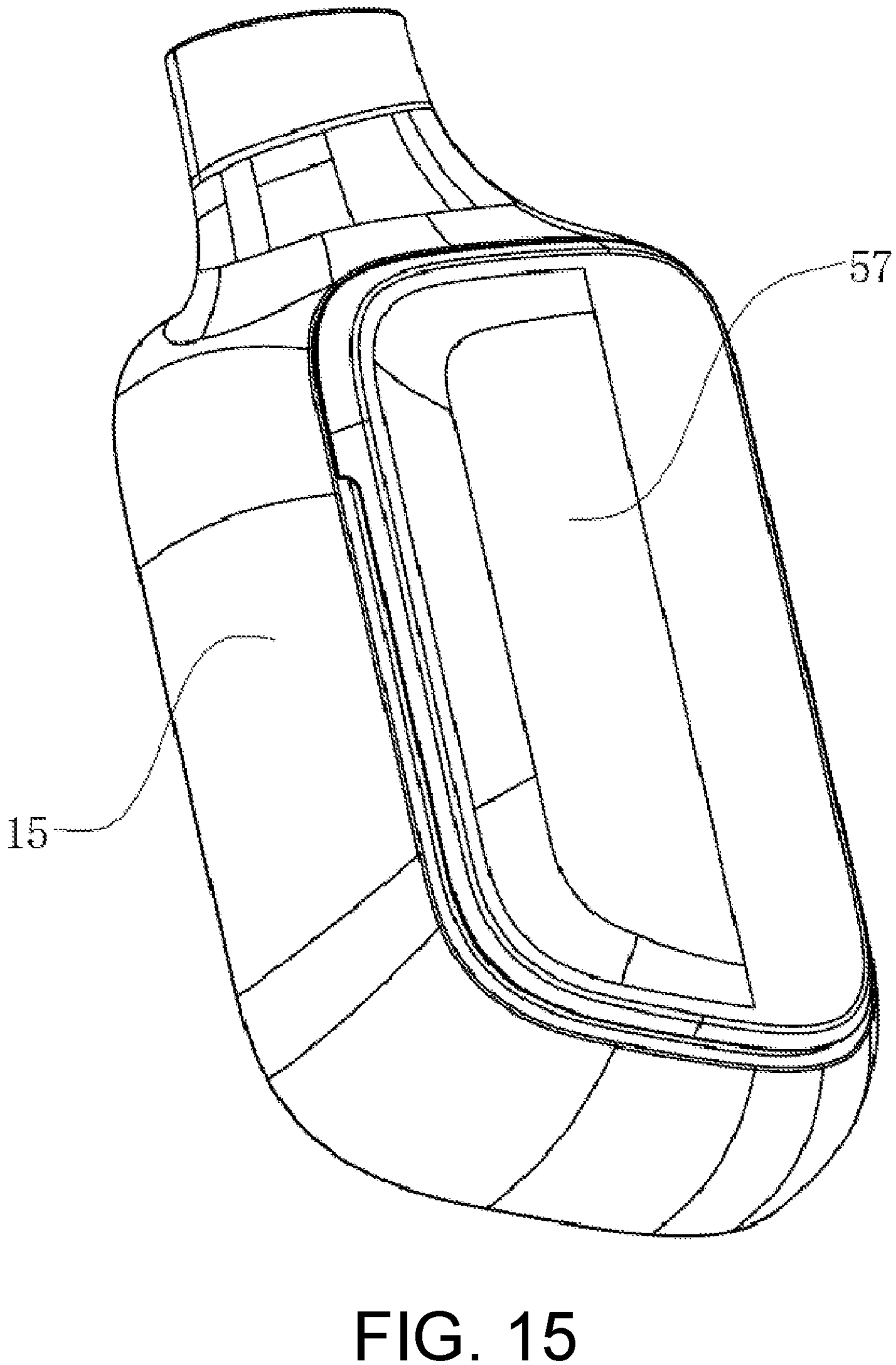
FIG. 15 is a schematic structural diagram of a case according to another embodiment of the present application.

Further, as shown in FIGS. 10 and 11, in order to facilitate the installation of the first magnetically conductive part 41, the base case portion 14 is further provided with a supporting boss 17 protruding into the cavity 10. The supporting boss 17 includes a supporting surface 170 that supports the first magnetically conductive part 41. The supporting boss 17 forms an installation space for accommodating the circuit board 5 between the first magnetically conductive part 41 and the base case portion 14, therefore, the first magnetically conductive part 41 does not compress the circuit board 5, and the circuit board 5 is more reliable in use. At the same time, the internal structural design of the bone conduction acoustic device is more reasonable and compact. The supporting boss 17 is also provided with a number of fourth positioning posts 173. As shown in FIG. 14, the first magnetically conductive part 41 is provided with a convex connecting portion 411 which has a mounting hole 412 adapted to the fourth positioning post 173. Through the mating of the fourth positioning post 173 with the mounting hole 412, the first magnetically conductive part 41 can be positioned on the supporting boss 17. Preferably, one or more of the fourth positioning posts 173 are hot-melt posts, and the first magnetically conductive part 41 can be fixed on the supporting boss 17 by heat-melting.

It should be pointed out that the supporting boss 17 can be in a closed ring shape or in an intermittent ring shape. As shown in FIG. 11, in this embodiment, the supporting boss 17 is in an intermittent ring shape with a number of notches 172, so as to eliminate the internal stress of the support boss 17 during molding to make it more accurate. At the same time, it can also facilitate the arrangement of the circuit board 5. For example, the circuit board 5 can be made as close to the wiring hole 11 as possible.

The circuit board 5 is electrically connected to the lead wire of the coil 40 and the external circuit. In order to facilitate the lead wire of the coil 40 to be drawn out, as shown in FIG. 14, an avoidance groove 410 for the lead wire to pass through is provided on the first magnetic conductive part 41 (In other embodiments, it may also be an avoidance hole). In this way, the lead wires are arranged in the avoidance groove 410, and there is no need to bend or the amount of bending is less, and the wiring is more convenient. As a preferred embodiment, the two ends of the first magnetically conductive part 41 are symmetrically provided with avoidance grooves 410, so that even if the first magnetically conductive part 41 is installed in a different position, it can be easily routed, has stronger fault tolerance, and is easier to install. As shown in FIGS. 11 and 12, the circuit board 5 is provided with a terminal **5*a* protruding toward the side where the coil 40 is located. The terminal 5*a* is a copper column. One end of the terminal 54 is connected and conducted with the lead wire of the coil 40, and the other end is connected and conducted with the circuit of the circuit board 5. The terminal 54 may be mounted on the circuit board 5 by SMT (Surface Mounted Technology), welded on the circuit board 5, or riveted on the circuit board 5**. Of course, the above three connection methods are not limited to alternative use, and two or three of them can be implemented at the same time.

Since the terminal **5*a* is closer to the coil 40, the connection between the coil 40 and the terminal 5*a* is more convenient. Preferably, the terminal 5*a* extends to the outside of the outer peripheral surface of the first magnetically conductive part 41 to further facilitate the welding operation of the lead wire of the coil 40** with it.

Referring to FIG. 13, the terminal **5*a* is arranged on the end of the circuit board 5 away from the wiring hole 11. On the one hand, it may prevent the terminal 5*a* from blocking the wiring hole 11, which makes it easier for the cables of the external circuit to pass through the wiring hole 11. On the other hand, the welding area of the cable between the circuit board 5** and the external circuit may be increased, so that the welding operation is more convenient and the welding quality is better.

Figure 16:
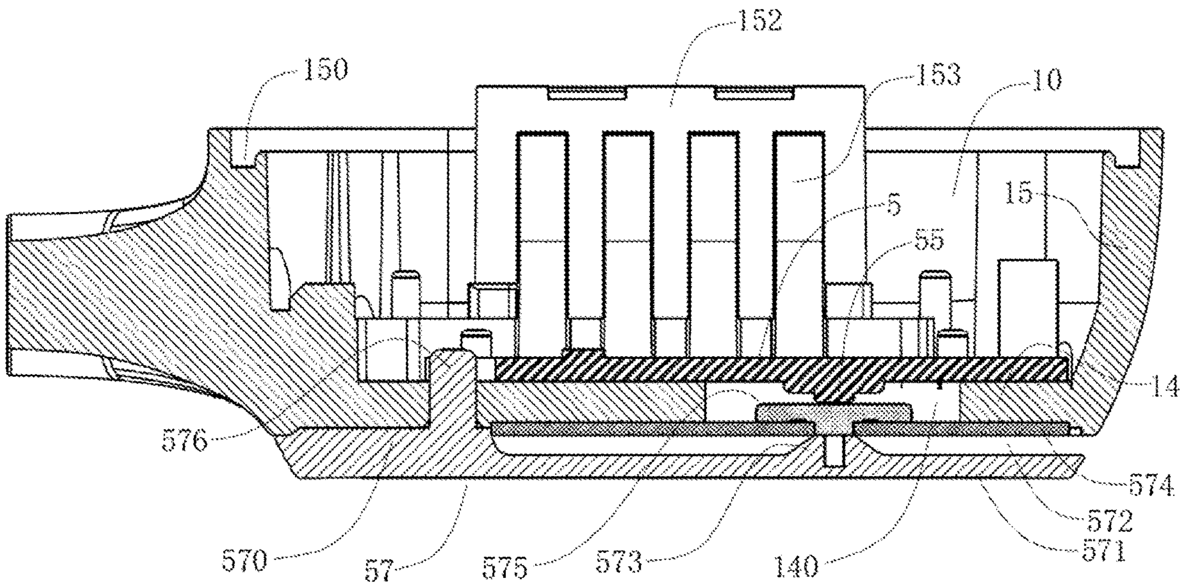
FIG. 16 is a schematic cross-sectional view of the button assembly connected to the case of an embodiment of the present application.
Figure 17:
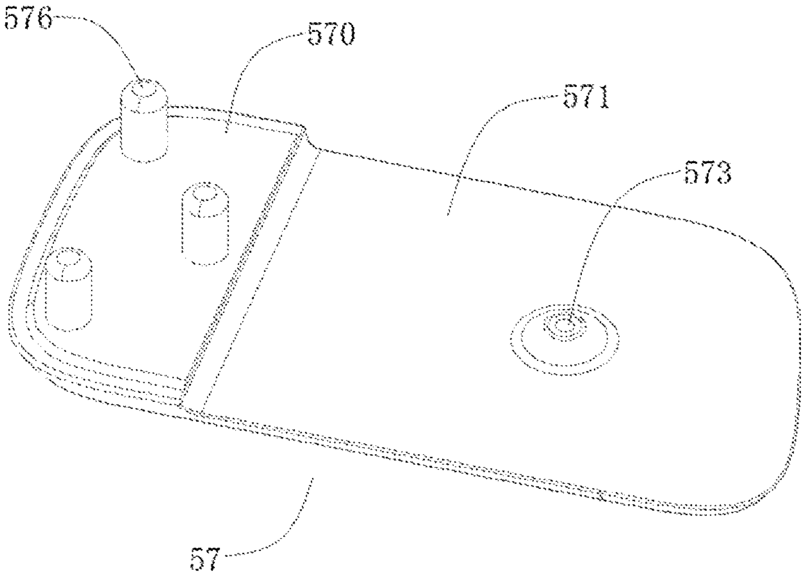
FIG. 17 is a schematic structural diagram of a pressing panel according to an embodiment of the present application.
Figure 18:
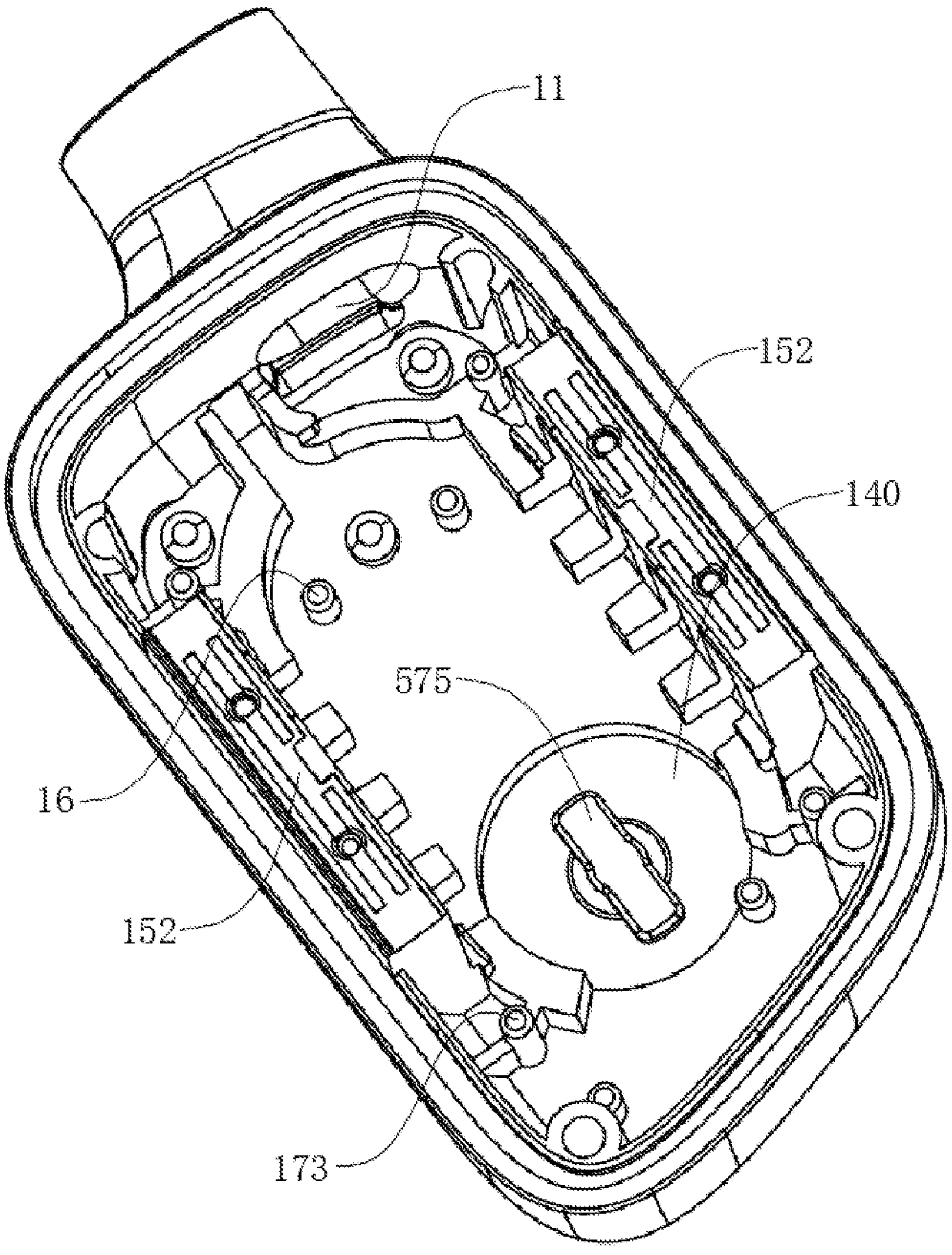
FIG. 18 is a schematic diagram of a case connected with a flexible pad and a pressing part according to an embodiment of the present application.

As shown in FIGS. 15 to 18, the second bone conduction acoustic device 61 also includes a button assembly connected to the circuit board 5, so that the user can perform certain control functions by manipulating the button assembly, such as turning on/off and switching audio, etc. Preferably, the button assembly includes a switch 55 provided on the circuit board 5 and a pressing panel 57 connected to the outer surface of the base case portion 14. The pressing panel 57 may be driven by pressing the pressing panel 57 to trigger the switch 55 to operate, thereby turning on or off the circuit, and sending out the corresponding signal. The switch 55 is preferably a tact switch, a micro switch, etc. In this embodiment, the switch 55 is a tact switch. As shown in FIGS. 16 and 17, the pressing panel 57 includes a base 570 and a pressing part 571 connected to the base 570. The thickness of the pressing part 571 is smaller than the thickness of the base 570. After the base 570 is connected to the base case portion 14, one end of the pressing part 571 is fixedly connected to the base 570, and the other end is suspended. There is a space 572 between the pressing part 571 and the base case portion 570, so that when the pressing part 571 is pressed, the pressing part 571 can be easily deformed, so that the pressing part 571 can trigger the switch 55 to implement corresponding functions. The base 570 and the base case portion 14 may be connected by glue or by a hot-melt column 576, for example.

Obviously, the thinner the pressing part 571 is, the easier it is to deform, and the smaller the pressure required to drive it to deform. But too thin thickness will also make the pressing part 571 easy to break. Preferably, the thickness of the pressing part 571 is greater than 0.3 mm, and more preferably, the thickness of the pressing part 571 is greater than 0.4 mm, and still more preferably, the thickness of the pressing part 571 is greater than 0.6 mm, so that the pressing part 571 is easy to deform, but not easy to break, and has better reliability.

The base case portion 14 is provided with an avoidance through hole 140 corresponding to the switch 55 so that the pressing panel 57 can contact the switch 55, and the pressing part 571 is provided with a bump 573 corresponding to the switch 55. In a preferred embodiment, when the button assembly is pressed, the bump 573 directly contacts and presses the switch 55. In another preferred embodiment, the button assembly further includes a flexible pad 574 connected to the outer surface of the base case 14 and a pressing part 575 connected to the flexible pad 574, and the pressing part 575 is located between the flexible pad 574 and the switch 55, the position of the bump 573 corresponds to the position of the pressing part 575. When the pressing part 571 is pressed, the bump 573 drives the flexible pad 574 to deform, so that the pressing part 575 presses the switch 55. Since the flexible pad 574 seals the avoidance through hole 140, external foreign matter will not enter the cavity 10. This makes it more waterproof and dust-proof, which is beneficial to the long-term and reliable operation of bone conduction earphones. Preferably, the material of the flexible pad 574 is silicone or rubber, which can be connected to the base case portion 14 by pasting or the like. The material of the pressing part 575 is plastic, which can be connected to the flexible pad 574 by attaching or the like.

Since the pressing panel 57 is arranged outside the base case portion 14, its area can be easily enlarged, so that the human hand can easily touch and operate the pressing panel 57, which improves the convenience of use. As a preferred embodiment, the outer contour shape of the pressing panel 57 and the base case portion 14 are consistent to improve the overall aesthetics. More preferably, the pressing part 571 occupies more than 50% of the surface area of the pressing panel 57; more preferably, the pressing part 571 occupies more than 70% of the surface area of the pressing panel 57; more preferably, the pressing part 571 occupies more than 90% of the surface area of the pressing panel 57.

In order to make the operation of the key structure more labor-saving, the base 570 is provided on one side of the pressing part 571, so that the hanging length of the pressing part 571 can be made longer, and it can be deformed with less force, thereby making pressing of pressing part 571 more labor-saving.

As shown in FIGS. 12 and 13, the circuit board 5 of the first bone conduction acoustic device 60 is provided with a first microphone 50 and a second microphone 51, wherein the first microphone 50 is mainly used to receive the voice of the user (voice), and the second microphone 51 is mainly used to receive ambient sound (background noise) for active noise reduction. Compared with the second microphone 51, the first microphone 50 is arranged on the case 1 closer to the user's mouth, so as to receive a louder and clearer voice.

Figure 19:
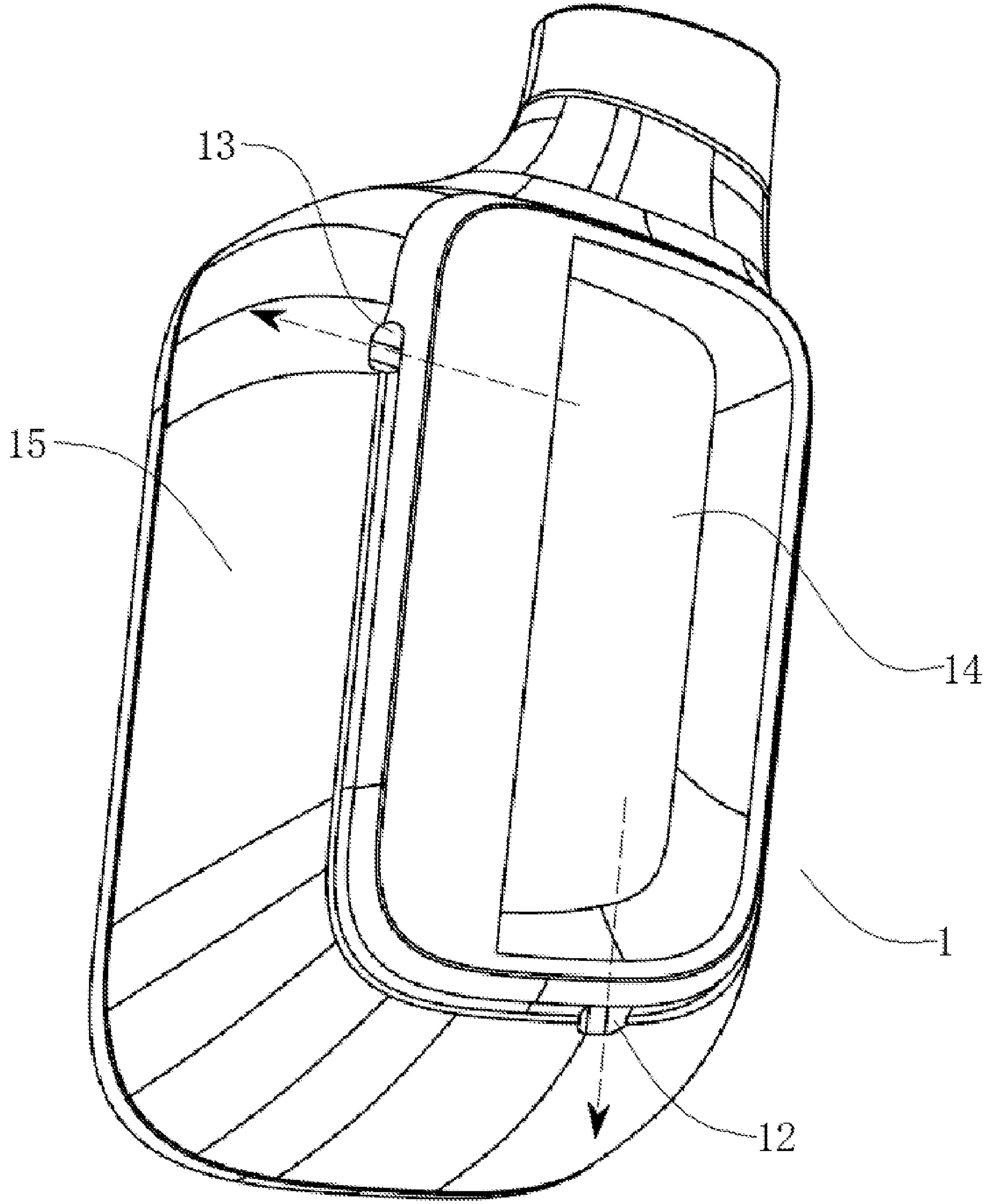
FIG. 19 is a schematic structural diagram of a bone conduction acoustic device provided with a first microphone hole and a second microphone hole according to an embodiment of the present application.

Further, as shown in FIGS. 11 and 19, the case 1 of the first bone conduction acoustic device 60 is also provided with a first microphone hole 12 corresponding to the first microphone 50 and a second microphone hole 12 corresponding to the second microphone 51 to allow the external sound to be better transmitted to and captured by the microphone.

As a preferred embodiment, the distance between the center of the first microphone hole 12 and the center of the second microphone hole 13 is not less than 15 mm (the center of the microphone hole refers to the center of the contour shape on the outer surface of the case 1 where the microphone hole is located) to reduce the correlation between the sounds received by the first microphone 12 and the second microphone 13, so that the microphone array formed by the two microphones has stronger directivity and is more convenient to perform noise reduction processing, the voice quality heard by the person talking with the user is higher, the background noise and wind noise are lower, and the sound is clearer.

As a preferred embodiment, as shown in FIG. 19, the positive directions of the axes of the first microphone hole 12 and the second microphone hole 13 are not blocked by the auricle. In this application, the positive direction of the microphone hole refers to the direction from the inside of the cavity 10 to the outside, referring to the direction of the arrow in FIG. 19. Because the shape of the auricle easily causes the sound to converge here, if the positive direction of the microphone hole axis is blocked by the auricle, it is easy to receive the sound converged at the auricle, resulting in unbalanced volume and affecting the sound quality of the bone conduction acoustic device.

As a preferred embodiment, the angle between the positive direction of the axis of the first microphone hole 12 and the second microphone hole 13 is not less than 70°, so that the sound collected by the first microphone 50 and the second microphone 51 has low correlation to improve the noise reduction effect; more preferably, the angle between the positive direction of the axis of the first microphone hole 12 and the second microphone hole 13 is 90°, at this time the sound collected by the first microphone 50 and the second microphone 51 has the least correlation and the noise reduction effect is the best.

It is understandable that in the present application, the first microphone 50 and the second microphone 51 form a microphone array, and the microphone array will form directivity when receiving the sound. Through the above reasonable design, the microphone array is directed to the direction of the person's mouth, so that the sound received during the reception is mainly the sound from the person's mouth, and the environmental noise is filtered out due to the directivity of the microphone array and is not processed. Two microphones have different input signals, and the algorithm is used to denoise the background noise and wind noise. Finally, the person who talks with the user can hear the clear voice after filtering out the environmental noise and wind noise to achieve noise reduction during the call. This improves the sound quality and call quality of the bone conduction acoustic device and the bone conduction earphone with the bone conduction acoustic device.

Figure 20:
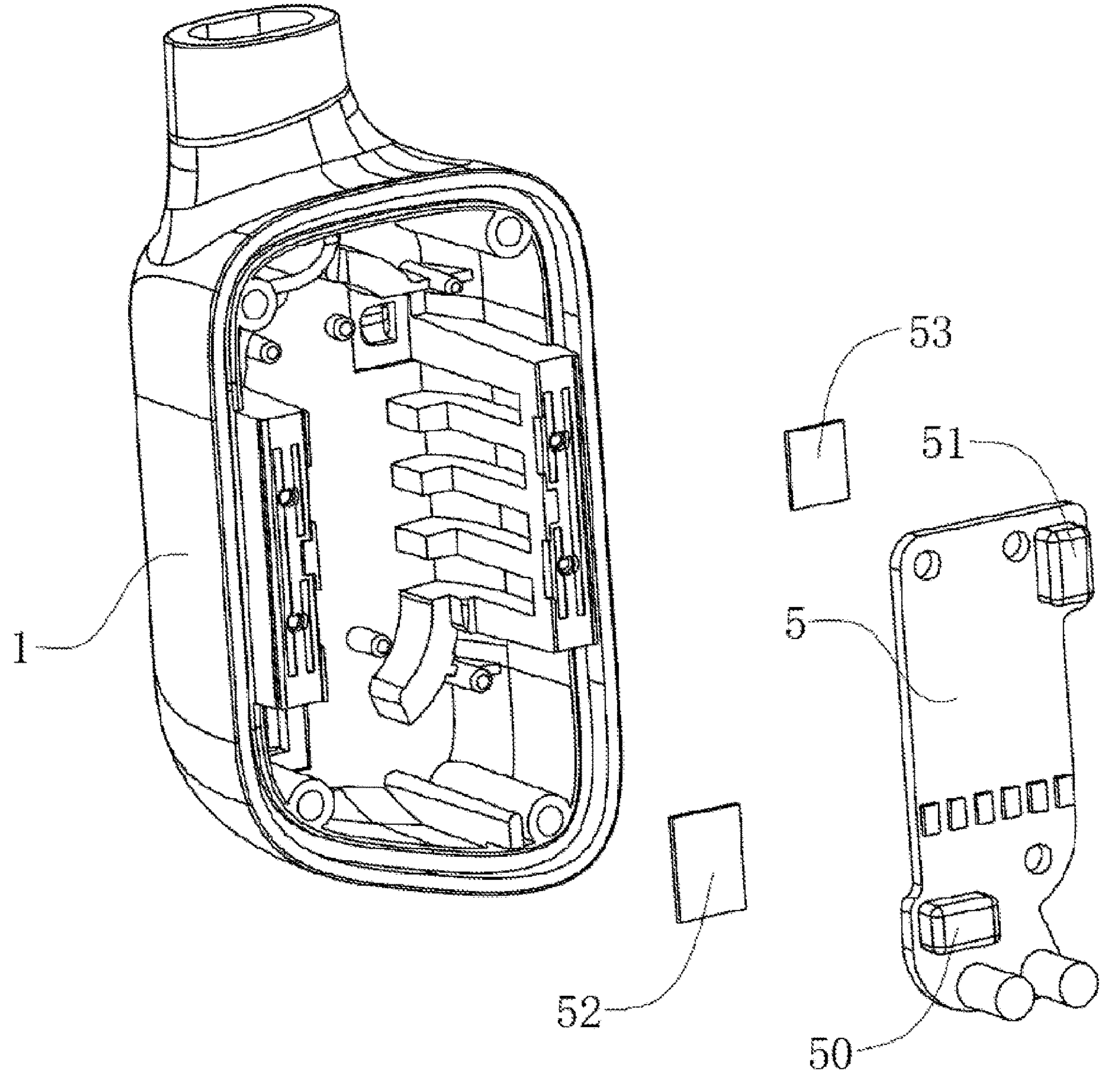
FIG. 20 is an exploded view of a case, a circuit board, a first waterproof and breathable membrane, and a second waterproof and breathable membrane according to an embodiment of the present application.

Since the first bone conduction acoustic device 60 is provided with a microphone hole, in order to make it have better waterproof performance, as shown in FIGS. 11 and 20, it also includes a first waterproof and breathable membrane 52 and a second waterproof and breathable membrane 53. The first waterproof and breathable membrane 52 and the second waterproof membrane 53 are attached to the inner wall of the case 1, wherein the first waterproof and breathable membrane 52 is used to seal the first microphone hole 12, and the second waterproof and breathable membrane 53 is used to seal the second microphone hole 13. Because the waterproof and breathable membrane has the characteristics of allowing gas to pass through but preventing liquid from passing, it can prevent external liquid from entering into the case 1 through the microphone hole without affecting sound transmission, which can protect the components inside the case 1 and improve the service life and reliability of the bone conduction acoustic device.

It is understandable that, because the bone conduction earphone of the present application can receive sound and reduce noise through the first bone conduction acoustic device 60, and is controlled by the second bone conduction acoustic device 61, its functions are more comprehensive set separately, so that the left bone conduction acoustic device 60 and the right bone conduction acoustic device 61 may reduce the internal parts, thereby the volume of each is small.

Figure 21:
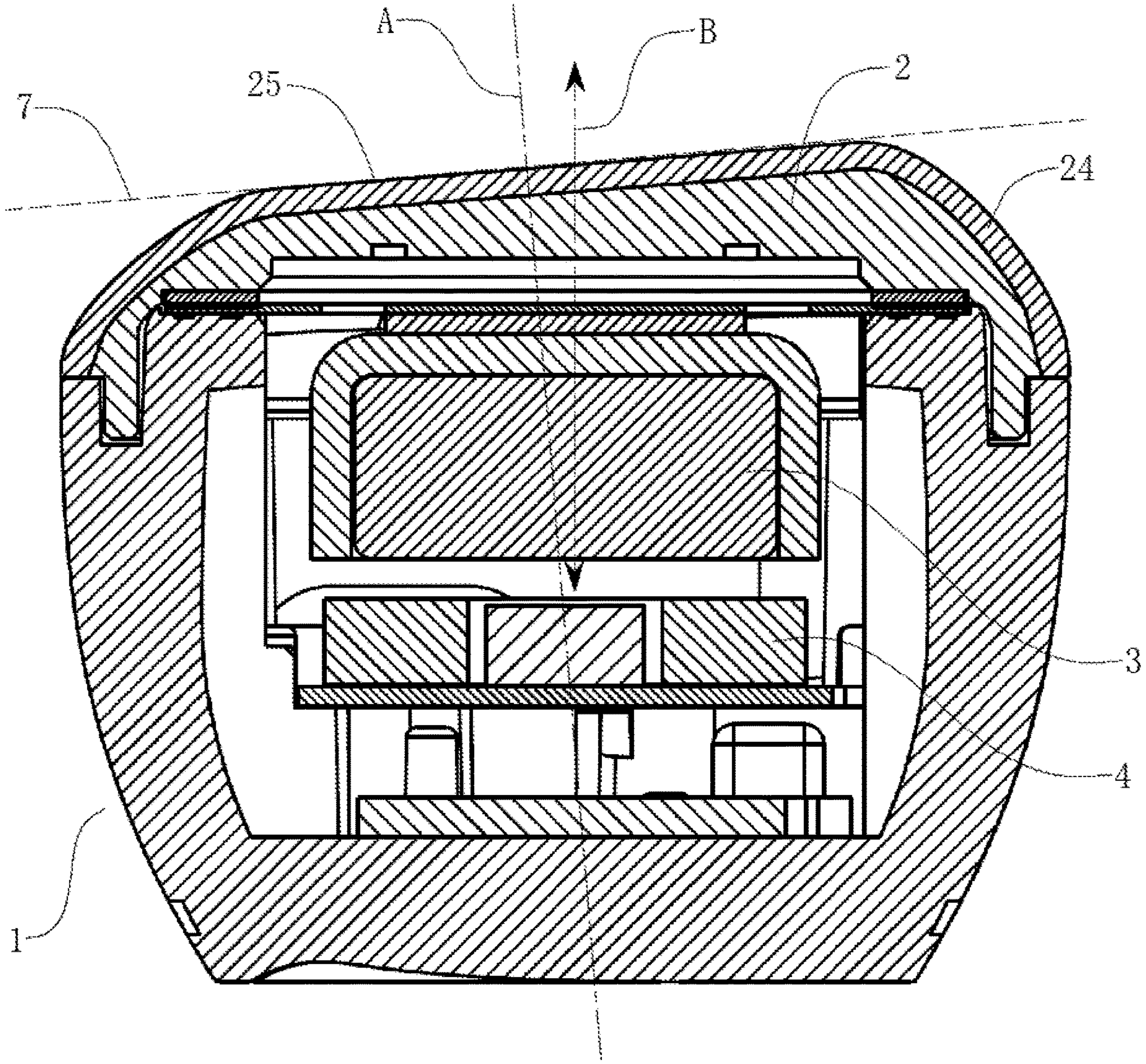
FIG. 21 is a schematic diagram of the bone conduction acoustic device against a human body part according to an embodiment of the present application.

When the bone conduction acoustic device of the present application is in use, its cover 2 faces the user's head skin, generally abutting the user's skin near the temporal bone of the ear. In order to make it more comfortable to use, as shown in FIG. 21, the cover 2 further includes a flexible layer 24 provided on the outside thereof. The flexible layer 24 may be made of a flexible material such as silica gel, so as to make it more comfortable to touch. As a preferred embodiment, the thickness of the flexible layer 24 ranges from 0.2 to 1 mm, preferably 0.3 to 0.6 mm, especially a thickness close to 0.4 to 0.5 mm is best. If the flexible layer 24 is too thin, for example, its thickness is 0.2 mm, the vibration sense of the part of the face in contact with the flexible layer 24 may be very strong, which will affect the user experience. If the flexible layer 24 is too thick, for example, its thickness is 1 mm, the vibration energy absorbed by the flexible layer 24 is too much, the vibration transmitted to the contact part of the face is greatly reduced, the sound quality of the voice heard by the user deteriorates, and the volume of the voice also decreases.

Figure 22:
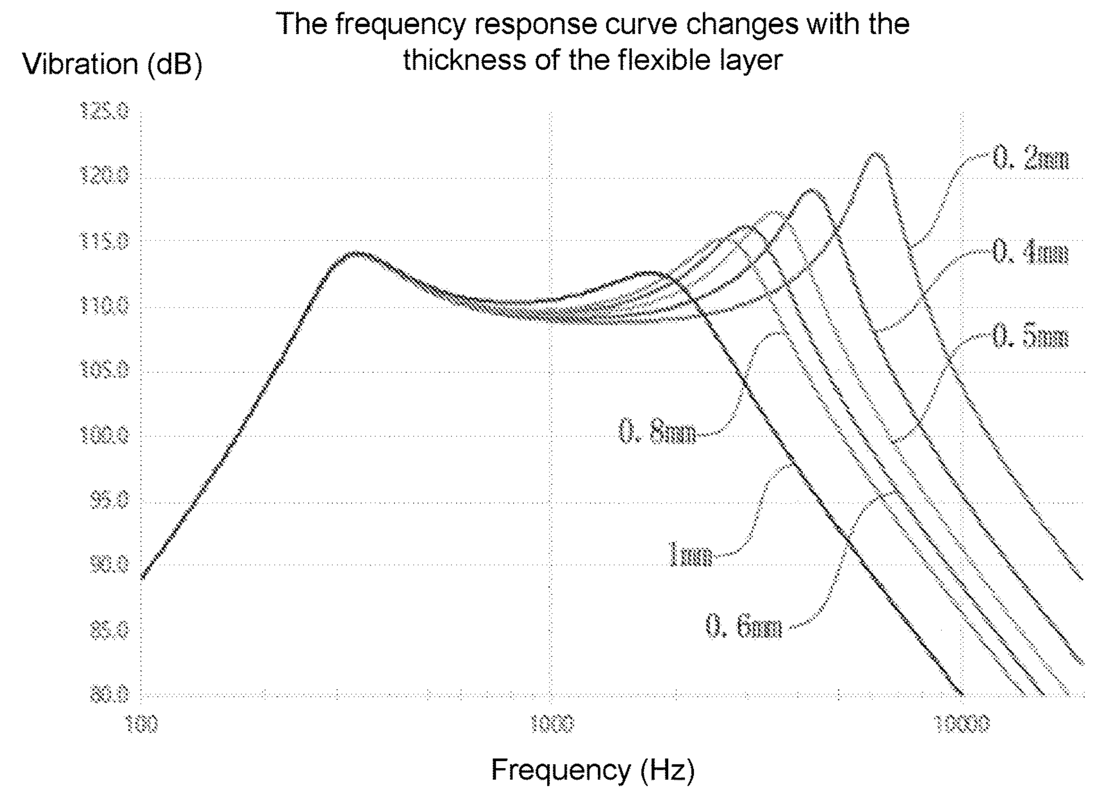
FIG. 22 is a graph showing the variation of the frequency response curve of a bone conduction earphone as a function of the thickness of the flexible layer according to an embodiment of the present application.
Figure 23:
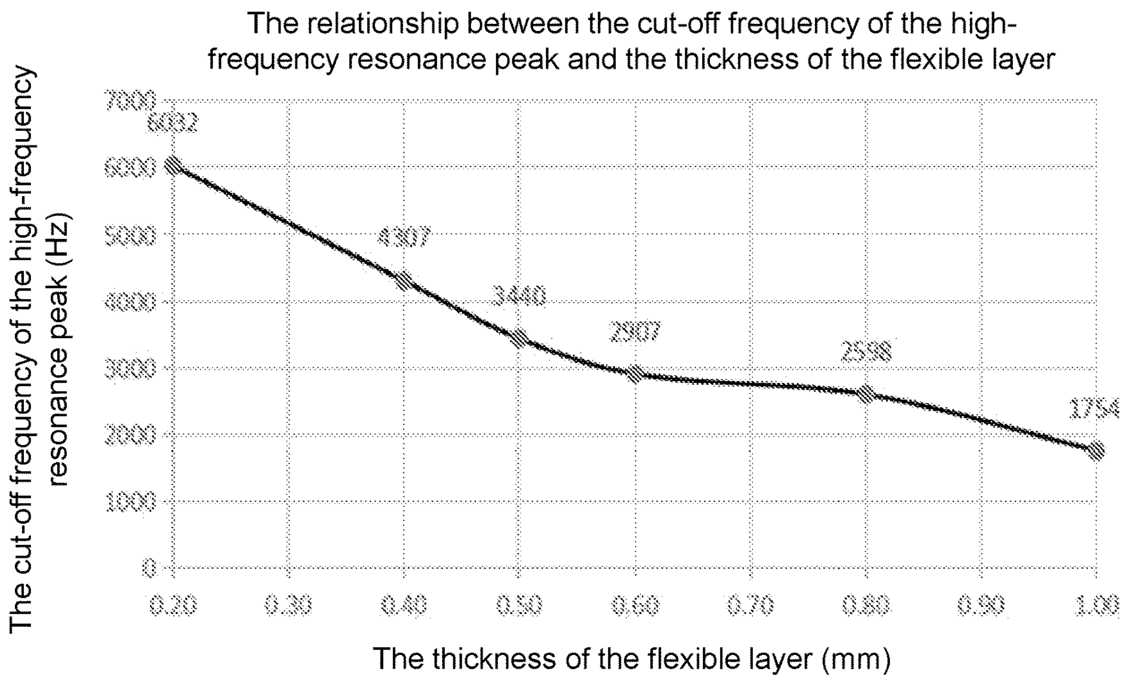
FIG. 23 is a diagram showing the relationship between the cut-off frequency of the high-frequency resonance peak in FIG. 22 and the thickness of the flexible layer.

Refer to FIG. 22 and FIG. 23, FIG. 22 is a frequency response curve diagram obtained by simulation when the thickness of the flexible layer 24 of the bone conduction earphone of an embodiment is changed, FIG. 23 shows the correspondence between the high frequency resonance peaks of the multiple frequency response curves in FIG. 22 and the thickness of the flexible layer. Generally, the frequency response curve has a high-frequency resonance peak and a low-frequency resonance peak. In general, the low frequency refers to the sound less than 500 Hz, the middle frequency refers to the sound in the range of 500 Hz to 4000 Hz, and the high frequency refers to the sound greater than 4000 Hz. The frequency difference between the low-frequency resonant peak and the high-frequency resonant peak is the bandwidth. When the low-frequency resonant peak is constant, the cut-off frequency of the high-frequency resonant peak reflects the size of the bandwidth. Generally speaking, the wider the bandwidth, the better the dynamic response, the greater the range of audible sounds, the richer the high-frequency details, the stronger the texture of some musical instruments in music, the more realistic the vocals, the clearer the sound levels, the more accurate the positioning, and the better the quality of the sound heard. According to FIG. 22 and FIG. 23, the flexible layer 24 has the widest bandwidth when the thickness is 0.2 mm, but at this time, the vibration sense conducted by the earphone to the face contact position is the strongest (the equivalent sensitivity exceeds 120 dB), which is unacceptable to the human senses. The flexible layer 24 has the narrowest bandwidth when the thickness is 1 mm. At this time, the vibration from the earphone to the contact position of the face is the slightest (the equivalent sensitivity is lower than 115 dB), but the narrow bandwidth causes serious sound quality degradation and poor hearing. When the thickness of the flexible layer 24 is 0.4 mm~0.5 mm, the bandwidth is moderate, the sound quality is good, and the vibration sense is also moderate at this time. Therefore, this thickness is used as the best thickness choice for the flexible layer 24 in the design of bone conduction earphones.

As shown in FIG. 21, the cover 2 has a contact surface 25 for contacting the skin 7 of the user's head. When the cover 2 is provided with a flexible layer 24, the contact surface 25 is the surface of the flexible layer 24. The contact surface 25 has a normal line A, and the magnet assembly 3 has a vibration axis B and reciprocates along the vibration axis B when vibrating. As a preferred embodiment, the vibration axis B is perpendicular to the contact surface 25. At this time, the angle between the vibration axis B and the normal line A is 0°, vibration force applied on the human body by the magnet assembly 3 is largest, and its volume is also the largest. At this time, the human body feels the strongest low-frequency vibration. As another preferred embodiment, the vibration axis B and the normal line A are arranged obliquely, and the angle between the two is any value between 0° and 35° excluding 0°. It is understandable that the greater the angle, the greater the component force parallel to the skin 7 generated by the vibration force, and the smaller the component force perpendicular to the skin 7, at this time, the vibration sense is weakened, and the volume felt by the human body is lower; while the smaller the angle is, it's exactly the opposite. Therefore, it is further preferred that the angle is set to any value from 0° to 10° excluding 0°. At this time, it has a larger volume and can reduce a certain low-frequency vibration sense to achieve a better balance between the two and make it more comfortable to use.

The realization of the angle is not limited. For example, the cover 2 can be set in a shape with a thick end and a thin end, so that the angle between the normal line A and the vibration axis B is greater than 0°.

As a preferred embodiment, the Young's modulus of the case 1 and the cover 2 (not including the flexible layer 24) of the bone conduction acoustic device is ≥2 GPa. For example, it may be 2 GPa, 4 GPa, 8 GPa, 12 GPa, 20 GPa, 25 GPa, 35 GPa, or 76 GPa. It is understood that the Young's modulus of the case 1 and the cover 2 may be the same or different.

Figure 24:
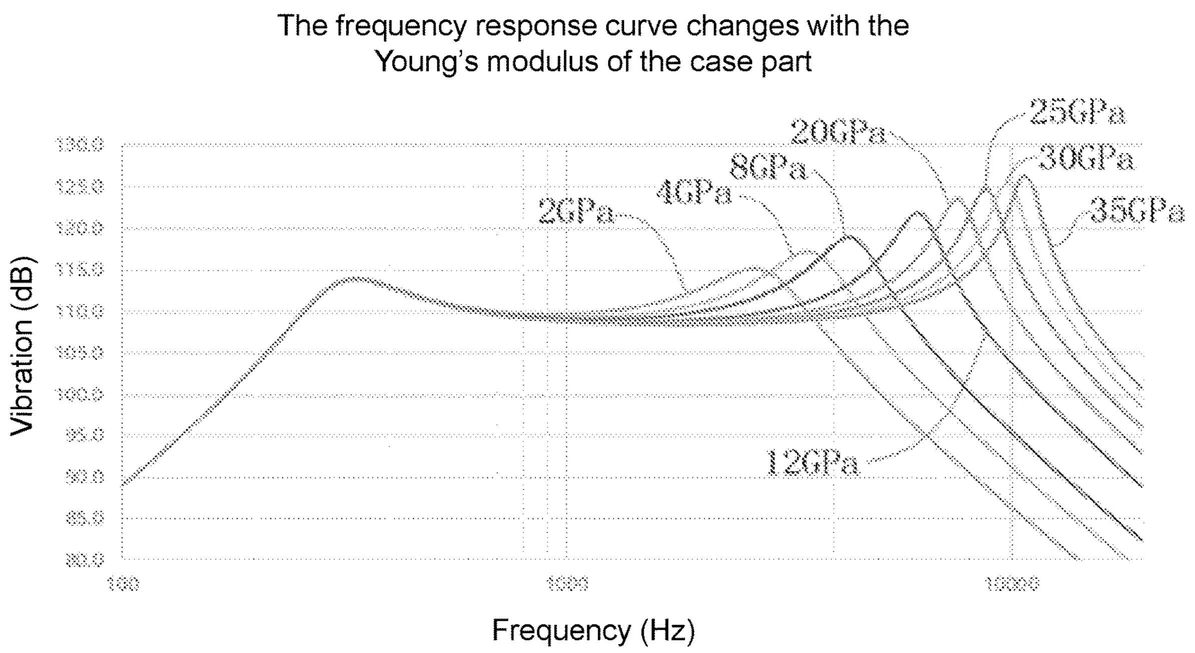
FIG. 24 is a graph showing the variation of the frequency response curve of a bone conduction earphone as a function of the Young's modulus of the case part according to an embodiment of the present application.

Further preferably, the Young's modulus of the case 1 and the cover 2 is any value between 8 GPa and 25 GPa. Referring to FIG. 24, FIG. 24 shows the frequency response curve diagram of the bone conduction earphone obtained by simulation when the case 1 and the cover 2 are made of materials with different Young's modulus. It can be seen from FIG. 24 that the material of the case part (case 1 and cover 2 (except the soft layer part)) of the bone conduction acoustic device has the best sound quality at 8 GPa to 25 GPa. This is because the bandwidth is too narrow when lower than 8 GPa, the sound quality is reduced, the sound is not clear enough and feels dry, and a lot of sound details are lost, the texture of the instrument is not good, the human voice is empty, the lack of voice friction, and the sound is too fake, the sound quality is significantly worse; while materials higher than 25 GPa tend to use denser materials such as high-density plastics or metal materials. Although the bandwidth is sufficient at this time, the use of high-density materials will increase the overall weight of the bone conduction earphones, which will finally affect the wearing experience of the user. Therefore, the case part (case 1 and cover 2 (except the soft layer part)) of the bone conduction acoustic device is selected to be made of a material with a Young's modulus of 8 GPa~25 GPa. At this time, the overall performance of the bone conduction earphones in terms of wearing experience, bandwidth, low-frequency and mid-high-frequency sensitivity, and earphones quality is the best.

Figure 25:
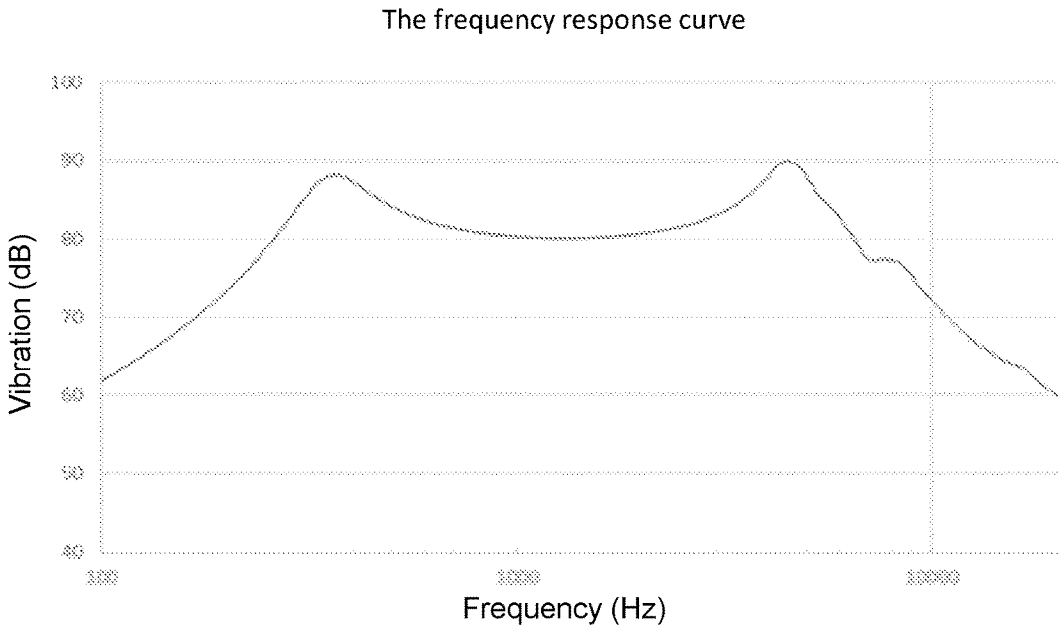
FIG. 25 is a graph of frequency response of a bone conduction earphone according to an embodiment of the present application.

As shown in FIG. 25, FIG. 25 shows the frequency response curve of a bone conduction earphone provided by the present application, wherein the horizontal axis is the vibration frequency, and the vertical axis is the vibration intensity of the bone conduction earphone. The vibration intensity herein can be expressed as the vibration acceleration of the bone conduction earphone. Generally, in the frequency response range from 1000 Hz to 10000 Hz, the flatter the frequency response curve, the better the sound quality of bone conduction earphones. The structure of bone conduction earphones, the design of components, and material properties may all have an impact on the frequency response curve. Generally, the low frequency refers to the sound less than 500 Hz, the middle frequency refers to the sound in the range of 500 Hz to 4000 Hz, and the high frequency refers to the sound greater than 4000 Hz. As shown in FIG. 25, the frequency response curve of bone conduction earphones has a resonance peak in both the low frequency and high frequency regions. The resonance peak in the low frequency region can be produced by the joint action of the flexure spring 30 and the fixed vibration component of the earphone (namely the magnet assembly 3). The resonance peak in the high-frequency region can be generated by the resonance of the entire earphone system under the driving of the vibrating component.

Obviously, the bone conduction earphone of the present application is provided with the flexure spring 30 so that the resonance peak appears in the low frequency region. This makes the frequency response curve in the 1000 Hz~10000 Hz frequency response range flatter, which effectively improves the sound quality of bone conduction earphones.

In addition, there is only one resonance peak in the low frequency region, and the sound quality of low frequency is better.

In order to further flatten the frequency response curve in the frequency response range of 1000 Hz to 10000 Hz, the Young's modulus of the case 1 and the cover 2 can be adjusted. Generally, under the condition of the same size, the greater the Young's modulus of material of the case 1 and cover 2, as the stiffness become greater, and the peak at the high frequency region of the frequency response curve of the bone conduction earphones may change towards the high frequency direction, which is conducive to adjusting the peak of the high-frequency region to a higher frequency, thereby obtaining a flatter frequency response curve in the frequency response range of 1000 Hz to 10000 Hz, and improving the sound quality of bone conduction earphones. Furthermore, by adjusting the Young's modulus of the case 1 and the cover 2, the peaks in the high frequency region may be adjusted outside the hearing range of human ears.

Refer to FIG. 1, the neck wear assembly 7 is connected between the first bone conduction acoustic device 60 and the second bone conduction acoustic device 61, which includes a battery compartment 70, a control compartment 71, a neckline 72 connected between the battery compartment 70 and the control compartment 71, a first ear hook 73 connected between the battery compartment 70 and the first bone conduction acoustic device 60, and a second ear hook 74 connected between the control compartment 71 and the second bone conduction acoustic device 61.

The first ear hook 73 and the second ear hook 74 are arc-shaped, and the shape may be adjustable or fixed. When the bone conduction earphone is worn, the two are respectively hooked above the left and right ears, and the neck line 72 is wrapped around the back of the human head to prevent the bone conduction earphone from falling.

Figure 26:
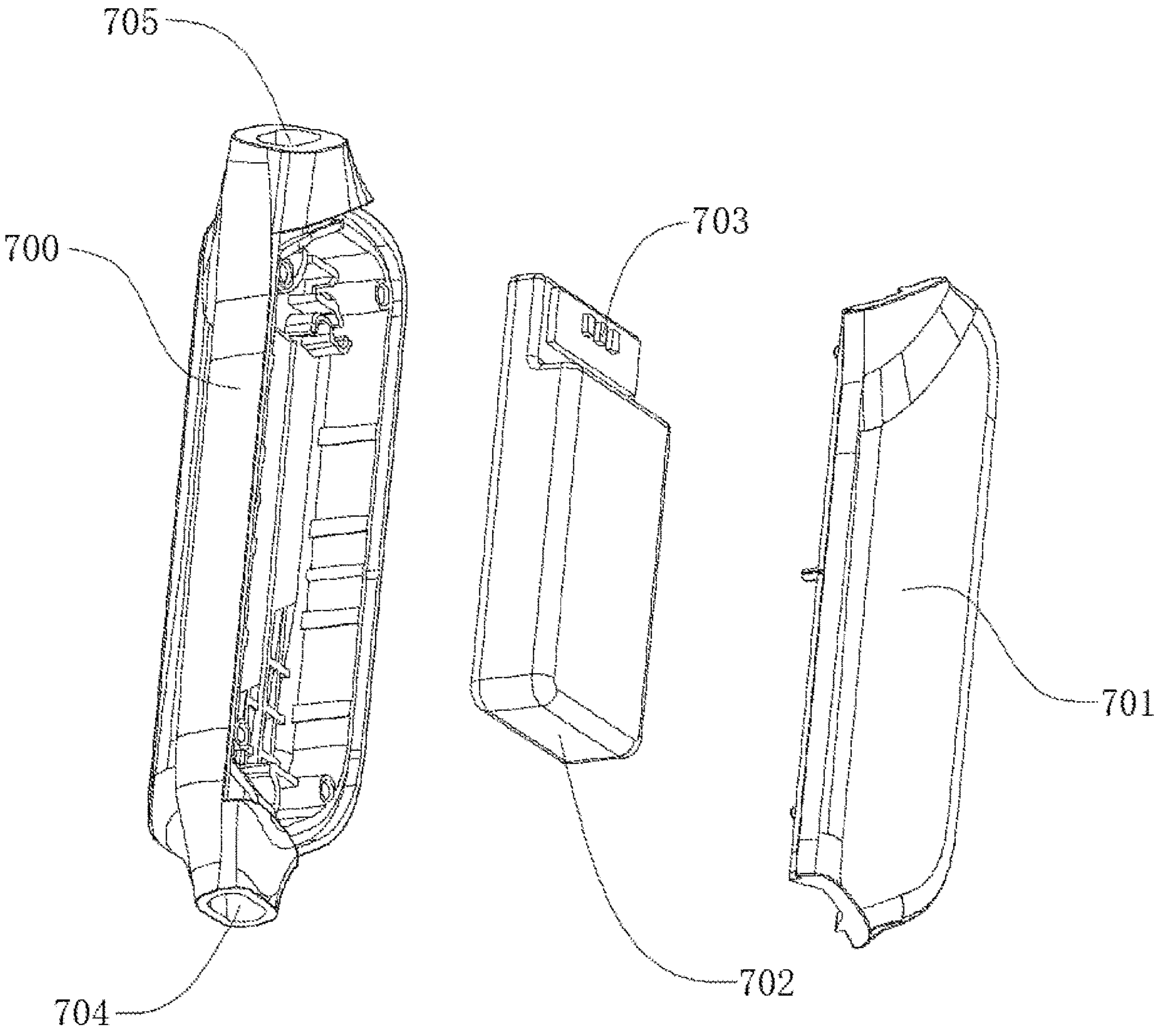
FIG. 26 is an exploded view of the battery compartment of the present application.

As shown in FIG. 26, the battery compartment 70 includes a battery box 700, a battery box cover 701, and a power source 702 and a wiring board 703 arranged in the battery box 700. The battery box 700 has a space for accommodating the power supply 702 and the wiring board 703. The power supply 702 and the wiring board 703 are fixedly installed in the battery box 700, and they are electrically connected. The battery box 700 is provided with a first interface 704 and a second interface 705 connected with the inside thereof, so as to pass a cable to connect to the external circuit. The battery box cover 701 is connected to the battery box 700 to seal the battery box 700 to protect the internal power supply 702 and wiring board 703 and other components. The power supply 702 is used to supply power to the two bone conduction acoustic devices and the main control board 712 in the control compartment 71. The power supply 702 may be, for example, a lithium battery.

Figure 27:
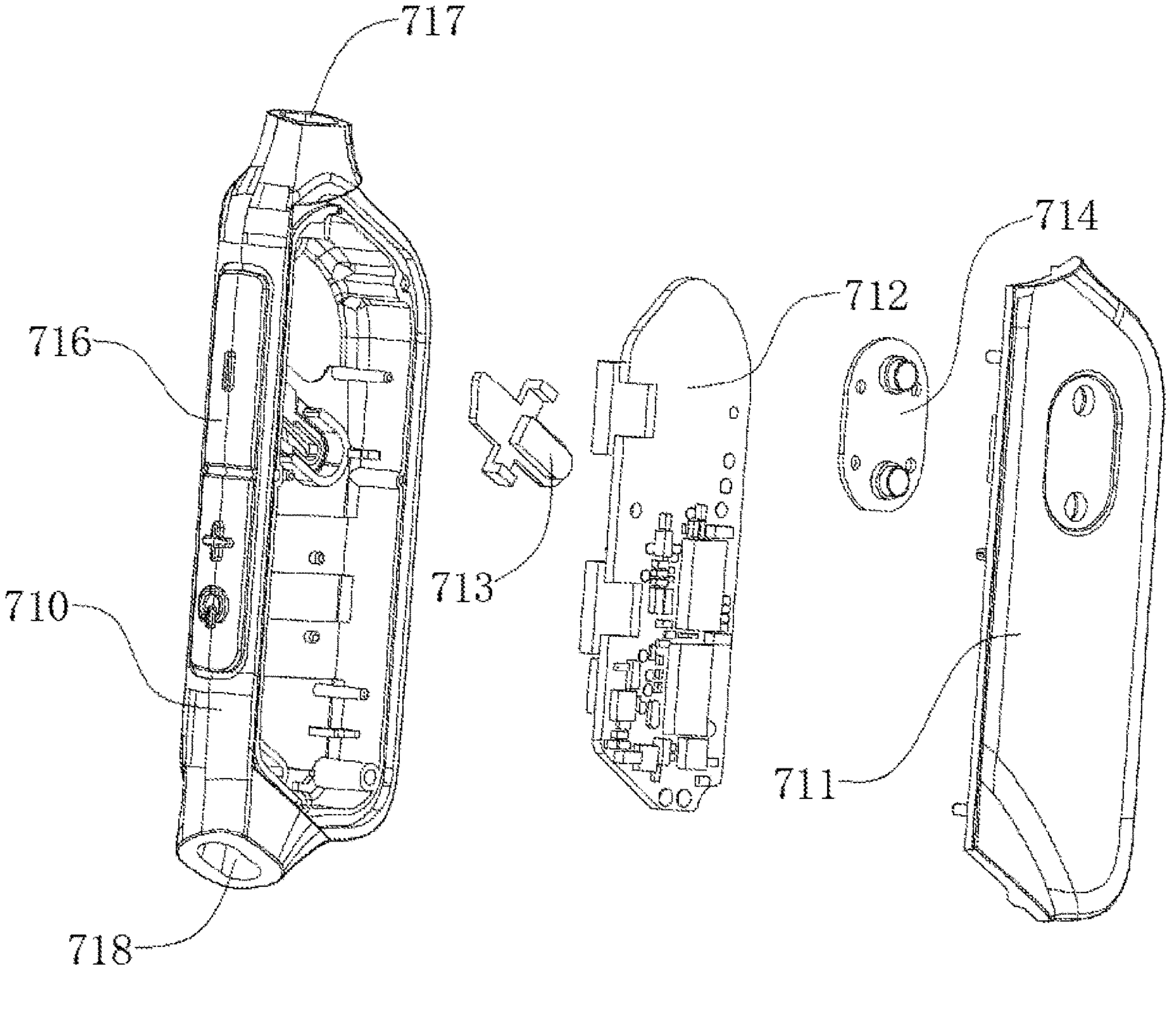
FIG. 27 is an exploded view of the control compartment of the present application.

As shown in FIG. 27, the control compartment 71 includes a control box 710, a control box cover 711, and a main control board 712 and a light guide post 713 both arranged in the control box 710. The control box 710 has an accommodating space for accommodating components such as the main control board 712. At the same time, the control box 710 is provided with a third interface 717 and a fourth interface 718 connected with the interior of the control box 710 for wiring cables and connecting with external circuits. The main control board 712 is electrically connected to the bone conduction acoustic device for data processing and sending control instructions. For example, it can control the volume of the bone conduction acoustic device, control the vibration of the bone conduction acoustic device, and connect with terminals such as smart phones via Bluetooth. As a preferred embodiment, a tact switch can be provided on the main control board 712, and a button 716 is provided on the surface of the control box 710 or the surface of the control box cover 711. The button 716 can be used to control the related functions of the bone conduction acoustic device, such as controlling the volume of the bone conduction acoustic device. It can also be configured to have different control effects for long press and short press, for example, long press is used to realize the switch function and short press is used to realize the volume adjustment function. One end of the light guide post 713 corresponds to the light-emitting element (such as LED lamp beads) provided on the main control board 712, and the other end extends to the control box 710 or the control box cover 711. The light of the light guide post 713 can be observed by persons outside the control compartment 71. Therefore, the part of the control box 710 or the control box cover 711 corresponding to the light guide post 713 may be set to be transparent, or the light guide post 713 may also be extended to the outside of the control compartment 71. By observing the color emitted by the light guide 713 and/or the frequency of flicker, etc., various information can be displayed, such as charging, normal operation, or insufficient power.

The control compartment 71 is provided with an electrode group 714 electrically connected to the main control board 712, and the electrode group 714 includes two charging electrodes protruding to the outside of the control compartment 71 for charging the power supply 702. As a preferred embodiment, the bone conduction earphone adopts magnetic attraction charging, which can adsorb the charging head during magnetic attraction charging.

Figure 28:
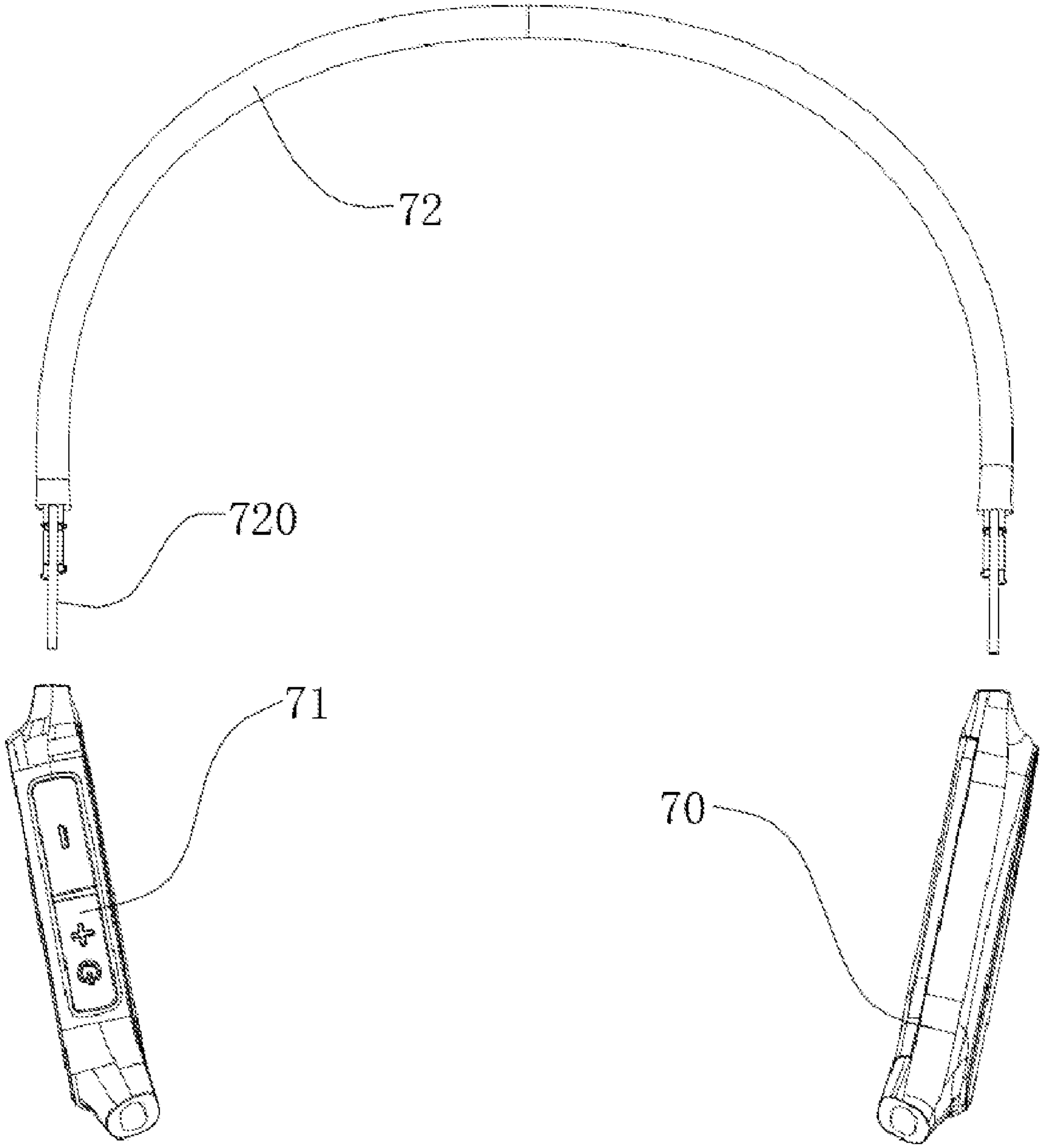
FIG. 28 is an exploded view of the neckline, battery box and control box of the present application.

The neckline 72 preferably adopts a flexible material such as silica gel, etc., with a titanium intermediate support structure wrapped therein, to be able to deform according to the shape of the head and maintain a certain clamping force for the wearing part, making it easier to wear. Both ends of the neckline 72 are respectively connected to the first interface 704 of the battery box 700 and the third interface 717 of the control box 710. The connection manner is not limited, for example, it can be bonding, ultrasonic welding, or snap connection. In order to realize the electrical connection between the wiring board 703 and the main control board 712, referring to FIG. 28, a first cable 720 is provided inside the neckline 72. One end of the first cable 720 is connected to the wiring board 703, and the other end is connected to the main control board 712. In a preferred embodiment, the first cable 720 and the wiring board 703, as well as the first cable 720 and the main control board 712 are connected by using direct connection manner. That is, both ends of the first cable 720 directly pass through the first interface 704 and the third interface 717 and are connected to the wiring board 703 and the main control board 712 by welding etc. (it is not necessarily directly welded to the wiring board 703 and the main control board 712, it may also be welded to the wires drawn from the wiring board 703 and the main control board 712). In another preferred embodiment, the first cable 720 and the wiring board 703, as well as the first cable 720 and the main control board 712 are connected by using a plug-in manner. That is, a first connector is provided in the first interface 704 and the third interface 717, the first connector in the first interface 704 is electrically connected to the wiring board 703, and the first connector in the third interface 717 is electrically connected to the main control board 712. A second connector electrically connected to the internal first cable 720 is provided at both ends of the neckline 72. One of the first connector and the second connector is provided with a pin, and the other is provided with a pin hole corresponding to the pins, thereby the electrical connection is realized through the plug-in fitting of the first connector and the second connector.

The case 1 of the bone conduction acoustic device is provided with an outwardly extending connecting pipe 1*a* (see FIG. 4 for reference numerals), and the connecting pipe 1*a* corresponds to the position of the wiring hole 11. The two ends of the first ear hook 73 are respectively connected to the connecting pipe 1*a* of the first bone conduction acoustic device 60 and the second interface 705 of the battery compartment 70. The two ends of the second ear hook 74 are respectively connected to the connecting pipe 1*a* of the second bone conduction acoustic device 61 and the fourth interface 718 of the control compartment 71. The connection manner is not limited, for example, it can be bonding, ultrasonic welding, or snap connection, etc.

Figure 29:
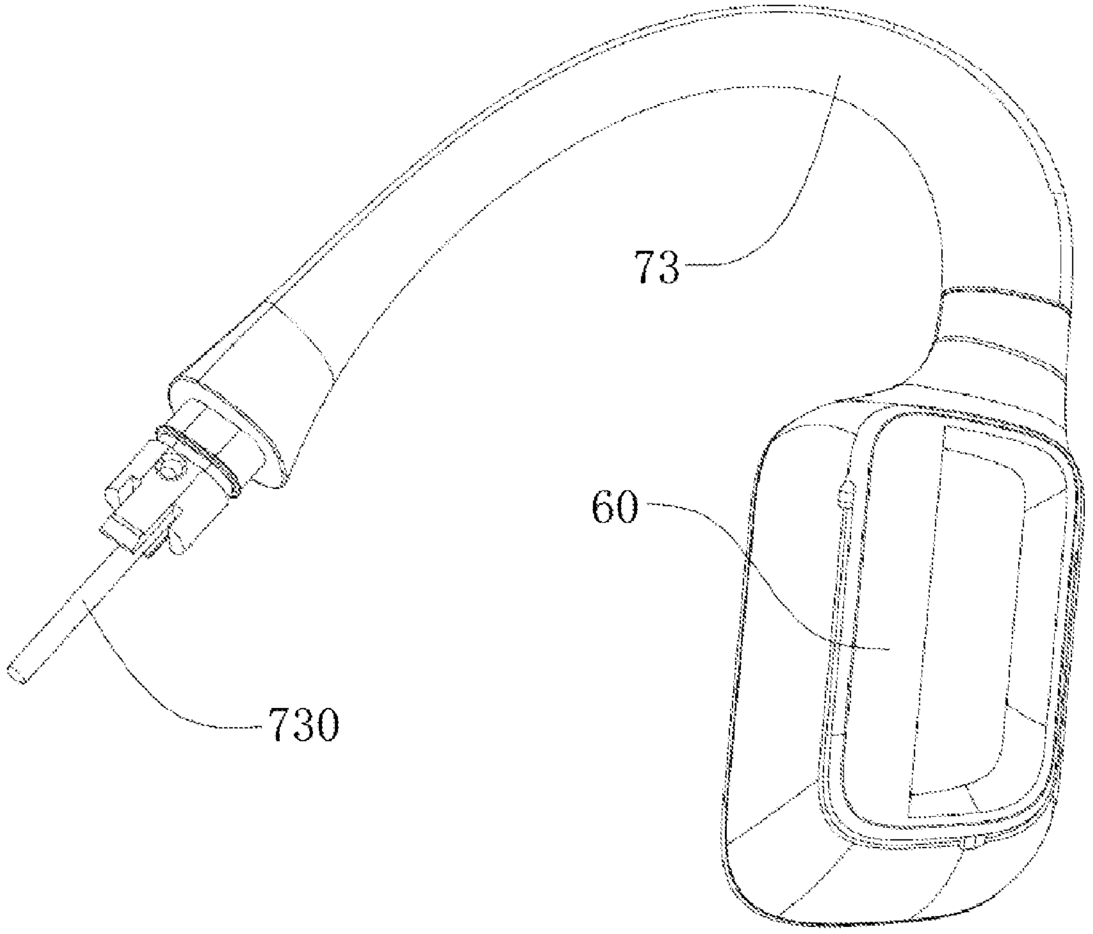
FIG. 29 is a schematic diagram of the connection between the first ear hook and the case in the present application.

In order to realize the connection between the circuit board 5 in the first bone conduction acoustic device 60 and the power supply 702, as shown in FIG. 29, a second cable 730 is provided in the first ear hook 73. One end of the second cable 730 is electrically connected to the circuit board 5, and the other end is electrically connected to the wiring board 703. The specific connection manner may be the direct connection manner described above or the plug-in connection manner described above. In the direct connection manner, the second cable 730 may be directly connected to the circuit board 5 and the wiring board 703, or may be connected to the wires drawn from the circuit board 5 and the wiring board 703.

Figure 30:
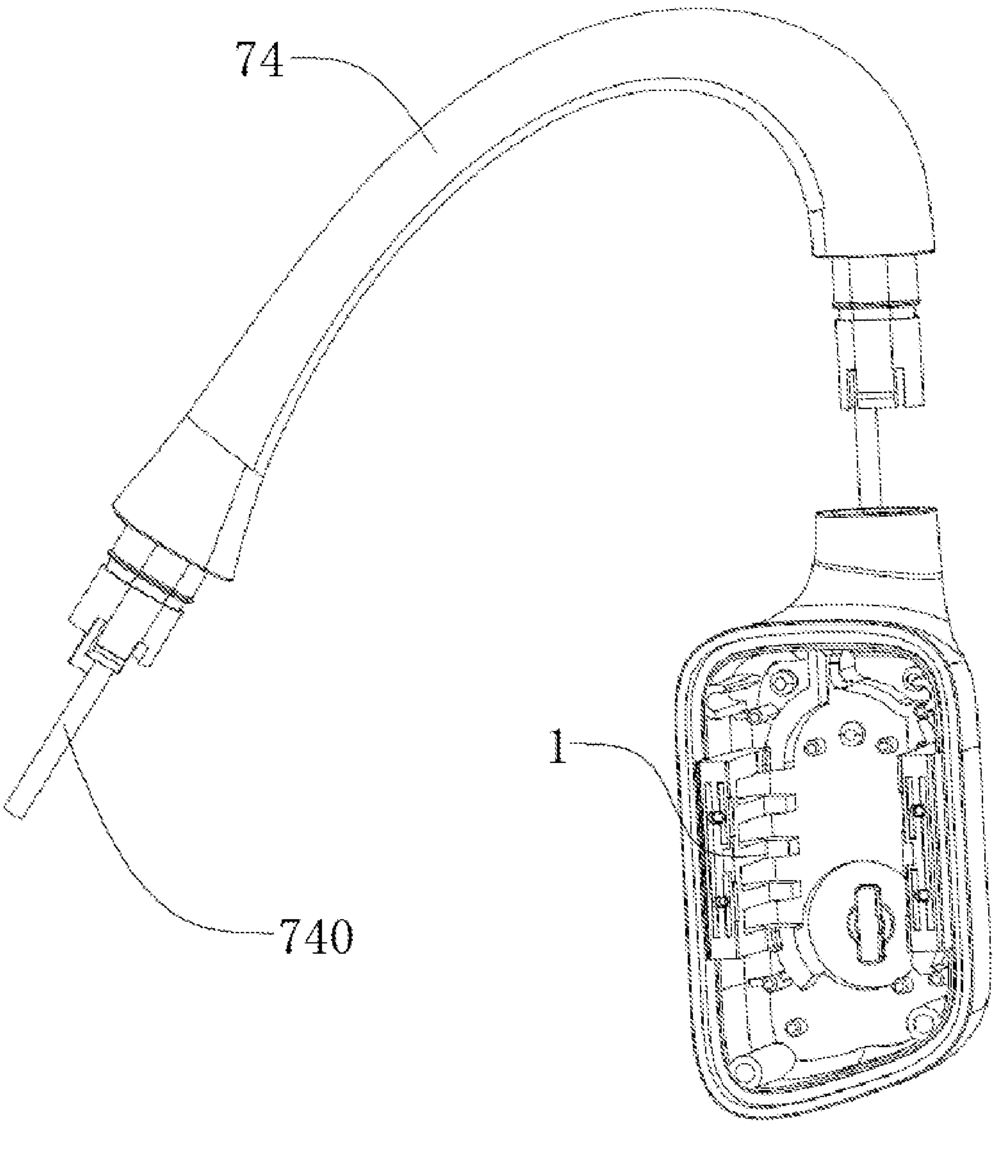
FIG. 30 is a schematic diagram of the connection between the second ear hook and the case in the present application.

Similarly, in order to realize the connection between the circuit board 5 in the second bone conduction acoustic device 61 and the main control board 712, as shown in FIG. 30, a third cable 740 is provided in the second ear hook 74. One end of the third cable 740 is electrically connected to the circuit board 5, and the other end is electrically connected to the main control board 712. The specific connection manner may be the direct connection manner described above or the plug-in connection manner described above. In the direct connection manner, the third cable 740 may be directly connected to the circuit board 5 and the main control board 712, or may be connected to the wires drawn from the circuit board 5 and the main control board 712.

The present application also provides a method for assembling bone conduction earphone, which includes the following steps: assembling a bone conduction acoustic device and an ear hook, and assembling a neck wear assembly.

Figure 31:
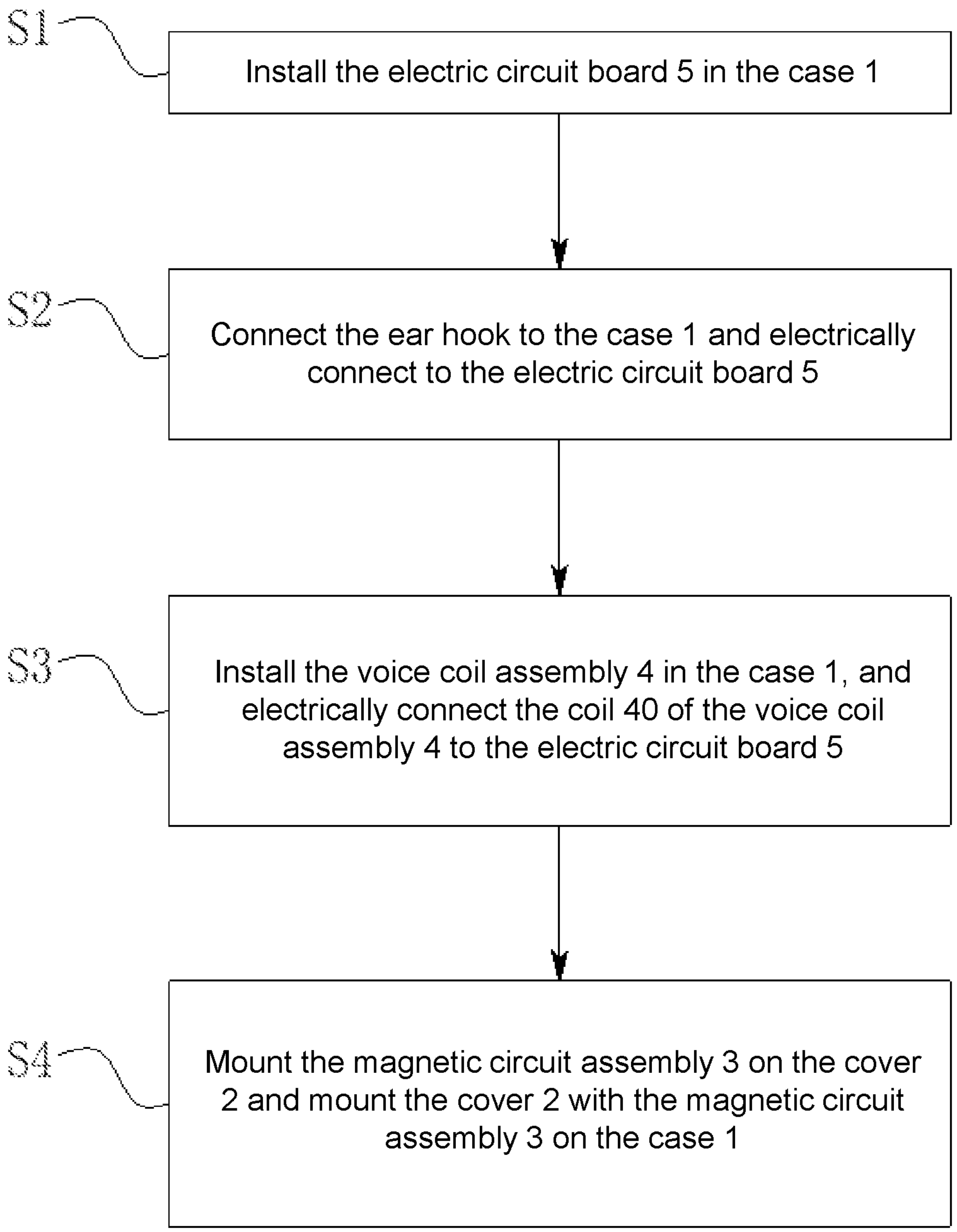
FIG. 31 is a flowchart of the steps for assembling the bone conduction acoustic device and the ear hook in the present application.

Specifically, referring to FIG. 31, the step of assembling the bone conduction acoustic device and the ear hook includes the following steps:

S1. installing the circuit board 5 in the case 1;

S2. installing the ear hook on the case 1 and electrically connecting the ear hook with the circuit board 5;

S3. installing the voice coil assembly 4 in the case 1, and electrically connecting the coil 40 of the voice coil assembly 4 with the circuit board 5;

S4. installing the magnet assembly 3 on the cover 2, and installing the cover 2 with the magnet assembly 3 on the case 1.

Through the above steps S1 to S4, the first bone conduction acoustic device 60 connected to the first ear hook 73 and the second bone conduction acoustic device 61 connected to the second ear hook 74 are obtained.

Figure 32:
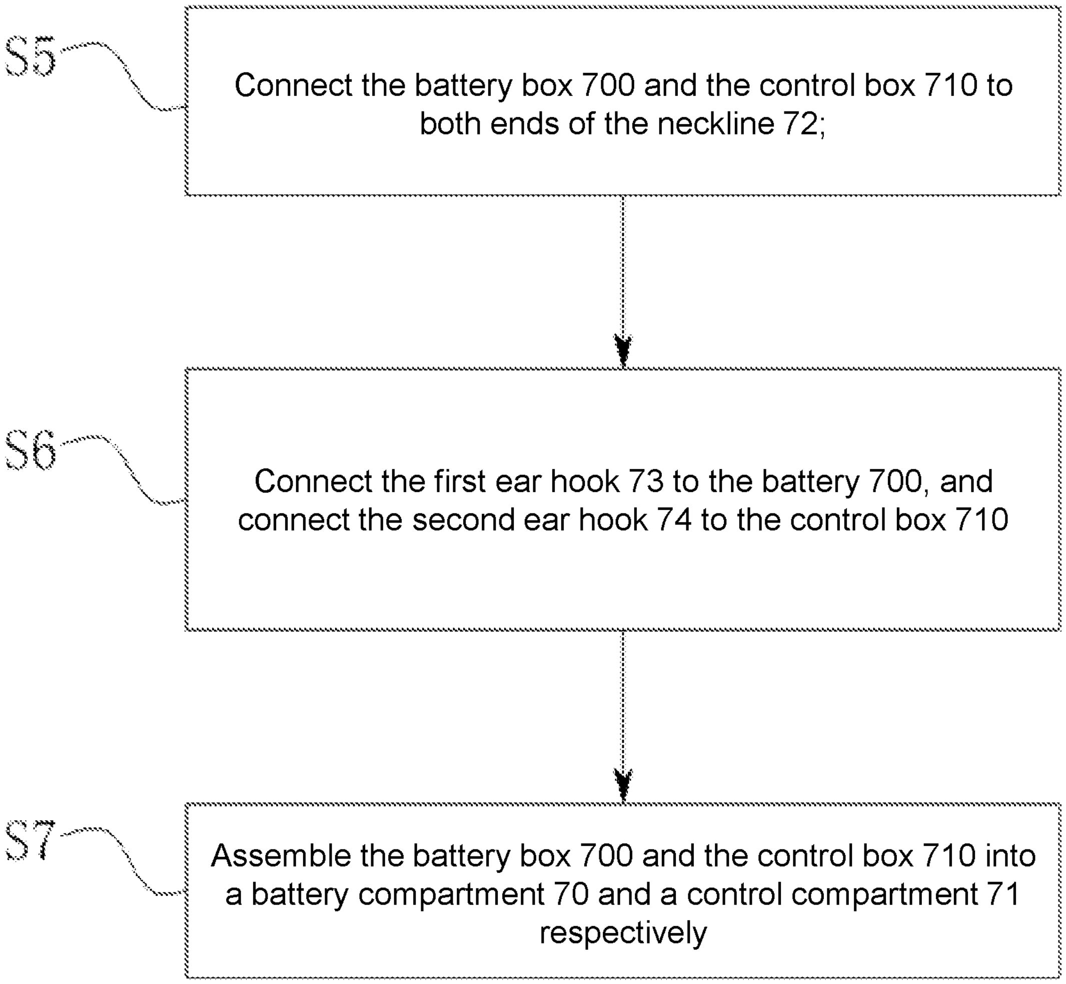
FIG. 32 is a flowchart of the steps for assembling the neck wear assembly in the present application.

Referring to FIG. 32, the step of assembling the neck wear assembly includes the following steps:

S5. connecting the battery box 700 and the control box 710 to both ends of the neckline 72;

S6. connecting the first ear hook 73 to the battery box 700, and connecting the second ear hook 74 to the control box 710;

S7. assembling the battery box 700 and the control box 710 into the battery compartment 70 and the control compartment 71 respectively.

In step S1, the step of installing the circuit board 5 in the case 1 includes the following steps: S10. mounting the circuit board 5 to the bottom of the case 1 (specifically on the base case portion 14) along the third positioning post 16; S11. heat-melting the third positioning post 16 by a hot-melting device to fix the circuit board 5 in the case 1.

In step S2, the ear hook needs to be connected to the case 1 of the corresponding bone conduction acoustic device. For example, the first ear hook 73 needs to be connected to the case 1 of the first bone conduction acoustic device 60, and the second ear hook 74 needs to be connected to the case 1 of the second bone conduction acoustic device 61. When connecting the first ear hook 73 to the case 1 of the first bone conduction acoustic device 60, the second cable 730 of the first ear hook 73 may be electrically connected with the circuit board 5 by direct connection manner such as welding, or by plugging, and then, glue is applied to package between the first ear hook 73 and the interface position of the first bone conduction acoustic device 60 to improve the sealing performance and the firmness of the connection. Similarly, in step S2, when connecting the second ear hook 74 to the second bone conduction acoustic device 61, the third cable 740 of the second ear hook 74 may be electrically connected with the circuit board 5 by direct connection manner such as welding, or by plugging, and then glue is applied to package between the second ear hook 74 and the interface position of the second bone conduction acoustic device 61.

In step S3, the step of installing the voice coil assembly 4 in the case 1 includes the following steps: S30. mounting the first magnetically conductive part 41 on the case 1 (specifically on the supporting boss 17 of the case 1) along the fourth positioning post 173; Step S31. heat-melting the fourth positioning post 173 by a hot-melting device to fix the first magnetically conductive part 41 on the supporting boss 17.

In step S4, the step of mounting the magnet assembly 3 on the cover 2 includes the following steps: S40. attaching double-sided tape to the connecting surface 20 of the cover 2 or the outer ring body 301 of the flexure spring 30; S41. attaching the flexure spring 30 to the connecting surface 20.

In step S4, the step of installing the cover 2 with the magnet assembly 3 on the case 1 includes the following steps: S42. applying glue on the annular groove 150 of the case 1 and/or on the annular boss 22 of the cover 2, and apply glue in the support seat 152; S43. inserting the annular boss 22 into the annular groove 150, and embedding the outer ring body 301 of the flexure spring 30 in the position limiting groove 1520 of the support base 152, so that the cover 2 and the case 1 are adhered, and the flexure spring 30 and the support base 152 are adhered.

For the first bone conduction acoustic device 60, which includes the first microphone 50 and the second microphone 51, before installing the circuit board 5, step S1 also includes the following steps: attaching the first waterproof and breathable membrane 52 and the second waterproof and breathable membrane 53 to the positions in the case 1 corresponding to the first microphone hole 12 and the second microphone hole 13. In addition, it is easy to understand that when the circuit board 5 is installed in step S1, the first microphone 50 and the second microphone 51 need to be aligned with the first microphone hole 12 and the second microphone hole 13, respectively; and the lead wire of the coil 40 is specifically connected to the terminal 5*a* of the circuit board 5.

As for the second bone conduction acoustic device 61 which includes a button assembly, before mounting the circuit board 5, step S1 further includes the following step: mounting the flexible pad 574 connected with the pressing part 575 on the outer surface of the base case portion 14, and then connecting the pressing panel 57 to the outer surface of the base case portion 14.

In step S5, when the battery box 700 and the control box 710 are respectively connected to the two ends of the neckline 72, first, the first cable 720 of the neckline 72 is led out into the battery box 700 and the control box 710, or connect the neckline 72 with the battery box 700 and the control box 710 by plugging, and then, apply glue and package the interface positions between the neckline 72 with the battery box 700 and the control box 710.

In step S6, when connecting the first ear hook 73 to the battery box 700, first, the second cable 730 may be led out into the battery box 700, or connect the first ear hook 73 and the battery box 700 by plugging, and then, apply glue and package the interface between the first ear hook 73 and the battery box 700; similarly, when connecting the second ear hook 74 to the control box 710, first the third cable 740 can be led out into the control box 710, or connect the second ear hook 74 and the control box 710 by plugging, and then, apply glue and package the interface between the second ear hook 74 and the control box 710.

In step S7, when assembling the battery compartment 70, first, install the components inside the battery compartment 70, such as the power supply 702 and the wiring board 703, into the battery compartment 700, and then cover the battery box cover 701, and apply glue and package the interface between the battery box 700 and the battery box cover 701. Similarly, when assembling the control compartment 71, first, install the components inside the control compartment 71, such as the main control board 712, the light guide post 713 and the electrode group 714, into the control box 710, and then cover the control box cover 711, and apply glue and package the interface between the control box 710 and the control box cover 711.

Obviously, for the case where the cables are led out into the battery box 700 and the control box 710, when the wiring board 703 and the main control board 712 are installed, the wiring board 703 and the main control board 712 need to be electrically connected to the corresponding cables; for the case of connecting by plugging manner, when installing the wiring board 703 and the main control board 712, it is necessary to electrically connect them with their respective connectors through signal wires and/or wires.

It is understandable that in the method of assembling the bone conduction earphone, the battery compartment 70 and the control compartment 71 are finally assembled, which is more convenient for wiring in the battery compartment 70 and the control compartment 71, and it can be tested after the electrical connection part is connected, and the battery compartment 70 and the control compartment 71 can be sealed after the test is qualified, which can prevent the battery compartment 70 and the control compartment 71 from being repeatedly opened, and the assembly is more convenient and the sequence is more reasonable.

The present application has at least the following advantages:

In the present application, the magnet assembly is arranged to be connected to the cover, and the voice coil assembly is arranged to be connected to the case. Therefore, when assembling, the circuit board may be installed in the case first, then install the ear hook and voice coil assembly, and connect the lead wire of the coil to the circuit board; finally, install the cover connected with the magnet assembly to the case, which realizes the installation of the bone conduction acoustic device and its connection with the ear hook, and its overall structure is simpler and more compact, and the assembly is more convenient; furthermore, the bone conduction earphone of the present application is provided with a neckline, a first ear hook and a second ear hook, which is more convenient to wear and has a more compact structure.

2. In the present application, the connecting arm of the flexure spring is set to be suspended and does not contact the second magnetically conductive part and the cover, so that its vibration is not disturbed, the amplitude is larger, and the sound quality, especially the low-frequency sound quality, is better.

3. By providing the first microphone for receiving the user's voice and the second microphone for receiving the ambient sound, noise can be effectively reduced according to the ambient sound, and the sound quality and use experience of the earphone can be improved; in addition, the case is provided with a waterproof and breathable membrane that seals the first microphone hole and the second microphone hole, which is beneficial to prevent liquid from entering into the case and damaging the internal electrical components, thereby improving the service life and reliability of the bone conduction acoustic device.

The foregoing is only a specific embodiment of the present application, and any other improvements made based on the concept of the present application are deemed to be within the protection scope of the present application.

What is claimed is:

1. A bone conduction earphone, comprising:

a first bone conduction acoustic device;

a second bone conduction acoustic device;

a control compartment, including a main control board for controlling the first bone conduction acoustic device and the second bone conduction acoustic device; and a battery compartment, including a power supply for supplying power to the first bone conduction acoustic device, the second bone conduction acoustic device and the main control board;

wherein the first bone conduction acoustic device and the second bone conduction acoustic device both comprise:

a case, including a base case portion and a side case portion connected with the base case portion, a cavity with an opening at one end is formed between the base case portion and the side case portion, the case is provided with a wiring hole connected with the cavity;

a cover, connected to the side case portion and sealing the opening;

a magnet assembly, connected to the cover and located in the cavity;

a voice coil assembly, arranged in the cavity, and arranged opposite to the magnet assembly for driving the magnet assembly to vibrate; and a circuit board, arranged in the cavity, and electrically connected to the voice coil assembly, and electrically connected to the main control board and the power supply by wiring through the wiring hole, the circuit board is located between the base case portion and the voice coil assembly.

2. The bone conduction earphone of claim 1, further comprising:

a neckline, connected between the control compartment and the battery compartment;

a first ear hook, connected between the battery compartment and the first bone conduction acoustic device; and a second ear hook, connected between the control compartment and the second bone conduction acoustic device.

3. The bone conduction earphone of claim 2, wherein the battery compartment further comprises a battery box, a wiring board electrically connected to the power supply, and a battery box cover that seals the battery box, and the power supply and the wiring board are both arranged in the battery box;

the neckline comprises a first cable electrically connected between the wiring board and the main control board;

the first ear hook comprises a second cable, which is electrically connected between the circuit board of the first bone conduction acoustic device and the wiring board;

the second ear hook comprises a third cable electrically connected between the circuit board of the second bone conduction acoustic device and the main control board.

4. The bone conduction earphone of claim 1, wherein the main control board is provided with a tact switch, and the control compartment is provided with a button corresponding to the tact switch;

the control compartment comprises a control box, a control box cover that seals the control box, and a lighting element arranged on the main control board, the main control board is arranged in the control box, and the light of the lighting component can be observed from the outside of the control compartment.

5. The bone conduction earphone of claim 1, wherein the voice coil assembly comprise a coil, a first magnetically conductive part and a first magnetic part, and the coil and the first magnetic part are both connected to a side of the first magnetically conductive part close to the magnet assembly;

the magnet assembly comprises a flexure spring connected with the cover, a second magnetically conductive part connected with the flexure spring, and a second magnetic part connected to a side of the second magnetically conductive part close to the voice coil assembly;

the coil generates an electromagnetic field with a changing polarity after being energized, the electromagnetic field can generate a varying attractive force and a repulsive force on the second magnetic part, and the second magnetic part drives the flexure spring to vibrate back and forth under the attractive force and the repulsive force.

6. The bone conduction earphone of claim 5, wherein the first magnetic part and the second magnetic part are arranged opposite to each other in the same pole, and there is a first attractive force between the first magnetic part and the second magnetically conductive part, and there is a second attractive force between the second magnetic part and the first magnetically conductive part; when the coil is not energized, the resultant force of the first attractive force and the second attractive force is equal to the repulsive force between the first magnetic part and the second magnetic part.

7. The bone conduction earphone of claim 5, wherein the flexure spring includes a main body, an outer ring body surrounding the outside of the main body, and a plurality of connecting arms connected between the body and the outer ring body, and the outer ring body is connected to the cover, and the main body is connected with the second magnetically conductive part;

the connecting arm is suspended in the air and is not in contact with the second magnetically conductive part;

the magnet assembly further includes a low-frequency adjustment plate connected between the body and the second magnetically conductive part, and the low-frequency adjustment plate is not in contact with the connecting arm.

8. The bone conduction earphone of claim 7, wherein the cover is provided with an avoidance hole for avoiding the movement of the main body and the connecting arm.

9. The bone conduction earphone of claim 7, wherein the case further includes a support seat connected with the side case portion, and the support seat is provided with a position limiting groove, and the outer ring body is at least partially fit to the position limiting groove.

10. The bone conduction earphone of claim 9, wherein the case further includes a reinforcing rib connected between the support seat, the base case portion and the side case portion;

the number of the reinforcing ribs is one; or, the number of the reinforcement ribs is multiple, and the multiple reinforcement ribs are arranged at intervals.

11. The bone conduction earphone of claim 1, wherein the case further includes a supporting boss located in the cavity, and the first magnetically conductive part is mounted on the supporting boss, and an installation space for accommodating the circuit board is formed between the first magnetically conductive part and the base case portion.

12. The bone conduction earphone of claim 1, wherein the surface of the cover in contact with the user's body has a normal line A;

the angle between the vibration axis B of the magnet assembly and the normal line A is any value between 0° and 35°;

preferably, the angle is any value between 0° and 10°.

13. The bone conduction earphone of claim 1, wherein the cover includes a flexible layer for contact with the user's skin;

the thickness of the flexible layer is 0.2~1 mm;

preferably, the thickness of the flexible layer is 0.3~0.6 mm;

further preferred, the thickness of the flexible layer is 0.4~0.5 mm.

14. The bone conduction earphone of claim 1, wherein the circuit board of the first bone conduction acoustic device includes a first microphone for receiving the user's voice and a second microphone for receiving ambient sound; the case is provided with a first microphone hole corresponding to the first microphone and a second microphone hole corresponding to the second microphone, and the distance between the center of the first microphone hole and the second microphone hole is not less than 15 mm.

15. The bone conduction earphone of claim 14, wherein the positive directions of the axes of the first microphone hole and the second microphone hole are not blocked by the auricle;

the angle between the positive direction of the axis of the first microphone hole and the second microphone hole is not less than 70°;

preferably, the angle between the positive direction of the axis of the first microphone hole and the second microphone hole is 90°.

16. The bone conduction earphone of claim 14, further comprising a first waterproof and breathable membrane and a second waterproof and breathable membrane, the first waterproof and breathable membrane sealing the first microphone hole, and the second waterproof and breathable membrane sealing the second microphone hole.

17. The bone conduction earphone of claim 1, wherein the second bone conduction acoustic device includes a button assembly that includes a switch provided on the circuit board and a pressing panel connected to the outer surface of the case for pressing to trigger the switch.

18. The bone conduction earphone of claim 17, wherein the pressing panel includes a base connected to the case and a pressing part connected to the base, one end of the pressing part is connected to the base and the other end is suspended, the pressing portion includes a bump corresponding to the switch position and protruding toward the switch, and the case is provided with an avoidance through hole corresponding to the switch position.

19. The bone conduction earphone of claim 18, wherein the button assembly further includes a flexible pad that seals the avoidance through hole and a pressing part located between the flexible pad and the switch.

20. A method for assembling bone conduction earphone, wherein the assembling bone conduction earphone includes:

a first bone conduction acoustic device;

a second bone conduction acoustic device;

a control compartment, which includes a main control board for controlling the first bone conduction acoustic device and the second bone conduction acoustic device;

a battery compartment, which includes a power supply for supplying power to the first bone conduction acoustic device, the second bone conduction acoustic device and the main control board;

a neckline, connected between the control compartment and the battery compartment;

a first ear hook, connected between the battery compartment and the first bone conduction acoustic device; and a second ear hook, connected between the control compartment and the second bone conduction acoustic device, wherein the first bone conduction acoustic device and the second bone conduction acoustic device both comprise:

a case, including a base case portion and a side case portion connected with the base case portion, a cavity with an opening at one end is formed between the base case portion and the side case portion, the case is provided with a wiring hole connected with the cavity;

a cover, connected to the side case portion and sealing the opening;

a magnet assembly, connected to the cover, and being located in the cavity;

a voice coil assembly, arranged in the cavity, and arranged opposite to the magnet assembly for driving the magnet assembly to vibrate; and a circuit board, arranged in the cavity, and electrically connected to the voice coil assembly, and electrically connected to the main control board and the power supply by wiring through the wiring hole, the circuit board is located between the base case portion and the voice coil assembly;

the method for assembling bone conduction earphone includes the steps of assembling a bone conduction acoustic device and an ear hook, and the step of assembling the bone conduction acoustic device and the ear hook includes the following steps:

installing the circuit board in the case;

installing the ear hook on the case and electrically connecting the ear hook with the circuit board;

installing the voice coil assembly in the case, and electrically connecting the coil of the voice coil assembly with the circuit board;

installing the magnet assembly on the cover, and installing the cover with the magnet assembly on the case.

21. The method for assembling bone conduction earphone of claim 20, wherein through the steps of assembling the bone conduction acoustic device and the ear hook, a first bone conduction acoustic device connected to the first ear hook and a second bone conduction acoustic device connected to the second ear hook are obtained, and the method for assembling the bone conduction earphone further comprises the following steps:

connecting the battery box and the control box to both ends of the neckline respectively;

connecting the first ear hook to the battery box, and connecting the second ear hook to the control box;

assembling the battery box and the control box into a battery compartment and a control compartment, respectively.

* * * * *